US010500653B2

(12) United States Patent
Budinscak, Jr. et al.

(10) Patent No.: US 10,500,653 B2
(45) Date of Patent: Dec. 10, 2019

(54) LAMINATED FOAM PRODUCT AND METHODS FOR MAKING LAMINATED FOAM PRODUCTS

(71) Applicant: Owens Corning Intellectual Capital, LLC, Toledo, OH (US)

(72) Inventors: John F. Budinscak, Jr., Wadsworth, OH (US); Jeffrey J. Van Sloun, Perrysburg, OH (US)

(73) Assignee: Owens Corning Intellectual Capital, LLC, Toledo, OH (US)

( * ) Notice: Subject to any disclaimer, the term of this patent is extended or adjusted under 35 U.S.C. 154(b) by 219 days.

(21) Appl. No.: 15/078,510

(22) Filed: Mar. 23, 2016

(65) Prior Publication Data

US 2016/0303663 A1 Oct. 20, 2016

Related U.S. Application Data

(62) Division of application No. 13/899,975, filed on May 22, 2013.
(Continued)

(51) Int. Cl.
*B23C 5/10* (2006.01)
*B32B 3/26* (2006.01)
(Continued)

(52) U.S. Cl.
CPC ............... *B23C 5/10* (2013.01); *B21D 22/14* (2013.01); *B23P 15/34* (2013.01); *B26D 1/14* (2013.01);
(Continued)

(58) Field of Classification Search
CPC .... B23C 5/10; B23C 5/12; B23C 5/14; B23C 2210/03; B23C 2210/24; B23C 2210/242;
(Continued)

(56) References Cited

U.S. PATENT DOCUMENTS 2,709,323 A 5/1955 Swan
3,088,254 A * 5/1963 Lipkins .................. B24D 7/005
144/24.09
(Continued)

FOREIGN PATENT DOCUMENTS

CA 2248982 7/2002
CA 2290416 3/2008
(Continued)

OTHER PUBLICATIONS

English translation of DE 10356731 B3, Mar. 2005.*
(Continued)

*Primary Examiner* — Alan Snyder
(74) *Attorney, Agent, or Firm* — Calfee, Halter & Griswold LLP

(57) ABSTRACT

Thermally laminated foam boards, methods for making thermally laminated foam boards, apparatus for making thermally laminated foam boards, smaller foam pieces made from thermally laminated foam boards, methods for making smaller foam pieces from thermally laminated foam boards, parts made from thermally laminated foam boards, methods for making parts from thermally laminated foam boards, and tools for making parts from thermally laminated foam boards are disclosed. The thermally laminated foam boards are made by thermally bonding at least two polystyrene boards together.

13 Claims, 35 Drawing Sheets

Related U.S. Application Data

(60) Provisional application No. 61/650,248, filed on May 22, 2012.

(51) Int. Cl.

| | |
|---|---|
| *B29C 65/02* | (2006.01) |
| *B32B 5/32* | (2006.01) |
| *B29C 65/00* | (2006.01) |
| *B32B 37/04* | (2006.01) |
| *B29C 65/14* | (2006.01) |
| *B29C 65/20* | (2006.01) |
| *B29C 53/18* | (2006.01) |
| *B26D 1/14* | (2006.01) |
| *B26D 3/00* | (2006.01) |
| *B32B 5/14* | (2006.01) |
| *B32B 3/30* | (2006.01) |
| *B21D 22/14* | (2006.01) |
| *B23P 15/34* | (2006.01) |
| *B29C 69/00* | (2006.01) |
| *B32B 27/30* | (2006.01) |
| *B32B 37/06* | (2006.01) |
| *B32B 37/10* | (2006.01) |
| *B32B 38/10* | (2006.01) |
| *B32B 38/18* | (2006.01) |
| *B29K 105/04* | (2006.01) |
| *B29C 65/26* | (2006.01) |
| *B26D 1/00* | (2006.01) |
| *B29K 25/00* | (2006.01) |
| *B29K 105/26* | (2006.01) |

(52) U.S. Cl.
CPC .............. *B26D 3/006* (2013.01); *B29C 53/18* (2013.01); *B29C 65/02* (2013.01); *B29C 65/1432* (2013.01); *B29C 65/1454* (2013.01); *B29C 65/1464* (2013.01); *B29C 65/203* (2013.01); *B29C 66/0222* (2013.01); *B29C 66/1122* (2013.01); *B29C 66/1142* (2013.01); *B29C 66/435* (2013.01); *B29C 66/45* (2013.01); *B29C 66/71* (2013.01); *B29C 66/727* (2013.01); *B29C 66/73921* (2013.01); *B29C 66/83413* (2013.01); *B29C 66/8416* (2013.01); *B29C 66/91411* (2013.01); *B29C 66/91421* (2013.01); *B29C 66/91645* (2013.01); *B29C 66/91921* (2013.01); *B29C 66/91931* (2013.01); *B29C 66/92611* (2013.01); *B29C 66/954* (2013.01); *B29C 69/001* (2013.01); *B32B 3/263* (2013.01); *B32B 3/30* (2013.01); *B32B 5/145* (2013.01); *B32B 5/32* (2013.01); *B32B 27/302* (2013.01); *B32B 37/04* (2013.01); *B23C 2226/62* (2013.01); *B23C 2240/08* (2013.01); *B26D 2001/002* (2013.01); *B26D 2001/0033* (2013.01); *B29C 65/20* (2013.01); *B29C 65/26* (2013.01); *B29C 66/723* (2013.01); *B29C 66/919* (2013.01); *B29C 66/91431* (2013.01); *B29C 66/929* (2013.01); *B29C 66/9241* (2013.01); *B29C 2793/009* (2013.01); *B29K 2025/06* (2013.01); *B29K 2105/043* (2013.01); *B29K 2105/26* (2013.01); *B29K 2995/0015* (2013.01); *B32B 37/06* (2013.01); *B32B 37/1054* (2013.01); *B32B 38/10* (2013.01); *B32B 38/1833* (2013.01); *B32B 2266/0228* (2013.01); *B32B 2272/00* (2013.01); *B32B 2305/022* (2013.01); *B32B 2307/304* (2013.01); *B32B 2309/10* (2013.01); *B32B 2309/105* (2013.01); *B32B 2419/00* (2013.01); *Y10T 428/24504* (2015.01)

(58) Field of Classification Search
CPC .......... B23C 2210/246; B23C 2210/54; B23B 51/048; B23B 51/0473
See application file for complete search history.

(56) References Cited

U.S. PATENT DOCUMENTS

| | | | |
|---|---|---|---|
| 3,141,595 A | 7/1964 | Edwards | |
| 3,409,965 A * | 11/1968 | Fisher | B23C 5/1018 407/54 |
| 3,571,559 A | 3/1971 | Spich | |
| 3,706,622 A | 12/1972 | Rush | |
| 3,754,359 A | 8/1973 | Scandaletos | |
| 3,769,124 A | 10/1973 | Johnson | |
| 3,879,254 A | 4/1975 | Hay, II | |
| 4,175,998 A | 11/1979 | Hay, II et al. | |
| 4,180,427 A | 12/1979 | Bertsch | |
| 4,437,270 A | 3/1984 | Langstraat | |
| 4,608,103 A | 8/1986 | Aldrich | |
| 4,864,802 A | 9/1989 | D'Angelo | |
| 4,904,324 A | 2/1990 | Heider | |
| 4,960,478 A | 10/1990 | Newkirk et al. | |
| 5,066,531 A | 11/1991 | Legg et al. | |
| 5,118,561 A | 6/1992 | Gusavage | |
| 5,415,504 A | 5/1995 | Wolf et al. | |
| 6,477,061 B1 | 11/2002 | Johnson | |
| 6,877,540 B2 | 4/2005 | Barman et al. | |
| 6,955,110 B1 | 10/2005 | Spletzer et al. | |
| 7,128,628 B2 | 10/2006 | Yeh | |
| 7,503,820 B2 | 3/2009 | Cheung | |
| 2002/0119722 A1* | 8/2002 | Welch | A61F 13/15593 442/382 |
| 2002/0144371 A1 | 10/2002 | Piombini | |
| 2005/0105981 A1* | 5/2005 | Byrley | B23B 51/0406 408/204 |
| 2005/0203525 A1* | 9/2005 | White | A61B 17/1617 606/80 |
| 2007/0169884 A1 | 7/2007 | Henderson et al. | |
| 2010/0028668 A1 | 2/2010 | Janda et al. | |
| 2010/0255242 A1 | 10/2010 | Dix | |
| 2011/0170966 A1 | 7/2011 | Novak et al. | |
| 2011/0217893 A1 | 9/2011 | Goering | |
| 2013/0018117 A1 | 1/2013 | Fox et al. | |
| 2013/0316143 A1 | 11/2013 | Budinscak | |

FOREIGN PATENT DOCUMENTS

| | | | |
|---|---|---|---|
| CN | 201931141 | 8/2011 | |
| DE | 2850015 | 5/1979 | |
| DE | 4421016 | 12/1995 | |
| DE | 10356731 B3 * | 3/2005 | ............... B23C 5/10 |
| DE | 102012204822 | 8/2012 | |
| EP | 558620 | 1/2000 | |
| EP | 922554 | 6/2003 | |
| EP | 1842574 | 5/2010 | |
| EP | 2653287 | 10/2013 | |
| GB | 1294606 | 11/1972 | |
| GB | 1346780 | 2/1974 | |
| GB | 1348271 | 3/1974 | |
| GB | 2044672 | 10/1980 | |
| GB | 2474431 | 4/2011 | |
| GB | 2489212 | 9/2012 | |
| JP | S6234519 | 7/1987 | |
| JP | 5-278114 | 10/1993 | |
| JP | 2000-334896 | 12/2000 | |
| WO | 92/08610 | 5/1992 | |
| WO | 95/25625 | 9/1995 | |
| WO | 05/118292 | 12/2005 | |
| WO | 11/045335 | 4/2011 | |
| WO | 12/016991 | 2/2012 | |
| WO | 12/058177 | 5/2012 | |

(56) References Cited

FOREIGN PATENT DOCUMENTS

OTHER PUBLICATIONS

International Search Report and Written Opinion from PCT/US13/042207 dated Dec. 9, 2013.
"Thermal bonding of insulation boards", one page web printout, Buerkle-GmbH, Sep. 6, 2013.
Office action from Chinese Application No. 201380038769.6 dated Oct. 13, 2015.
Office action from U.S. Appl. No. 13/899,975 dated May 8, 2015.
Office action from U.S. Appl. No. 13/899,975 dated Sep. 24, 2015.
Notice of Abandonment from U.S. Appl. No. 13/899,975 dated Aug. 26, 2016.
Office action from Chinese Application No. 201610223816.X dated Dec. 22, 2016.
Office Action from MX Application No. MX/a/2014/014206 dated Jul. 25, 2018.
Office Action from MX Application No. MX/a/2014/014206 dated Jan. 14, 2019.
Office Action from CA Application No. 2,874,498 dated Mar. 29, 2019.
Office Action from MX Application No. 14/14206 dated Jul. 17, 2019.

* cited by examiner

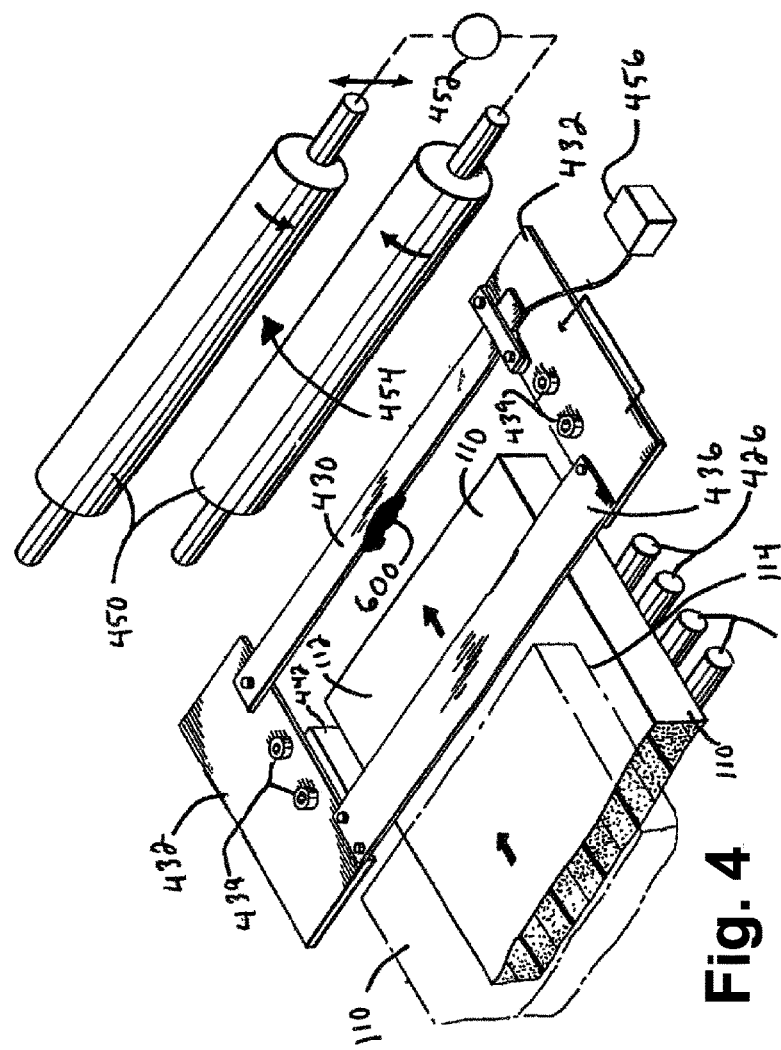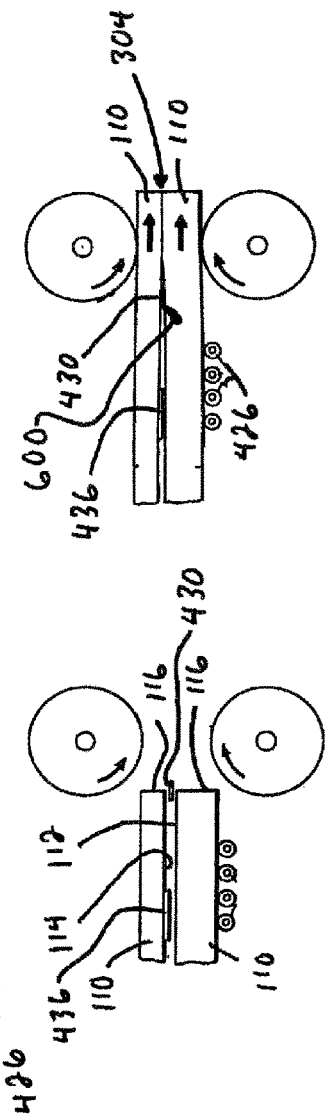

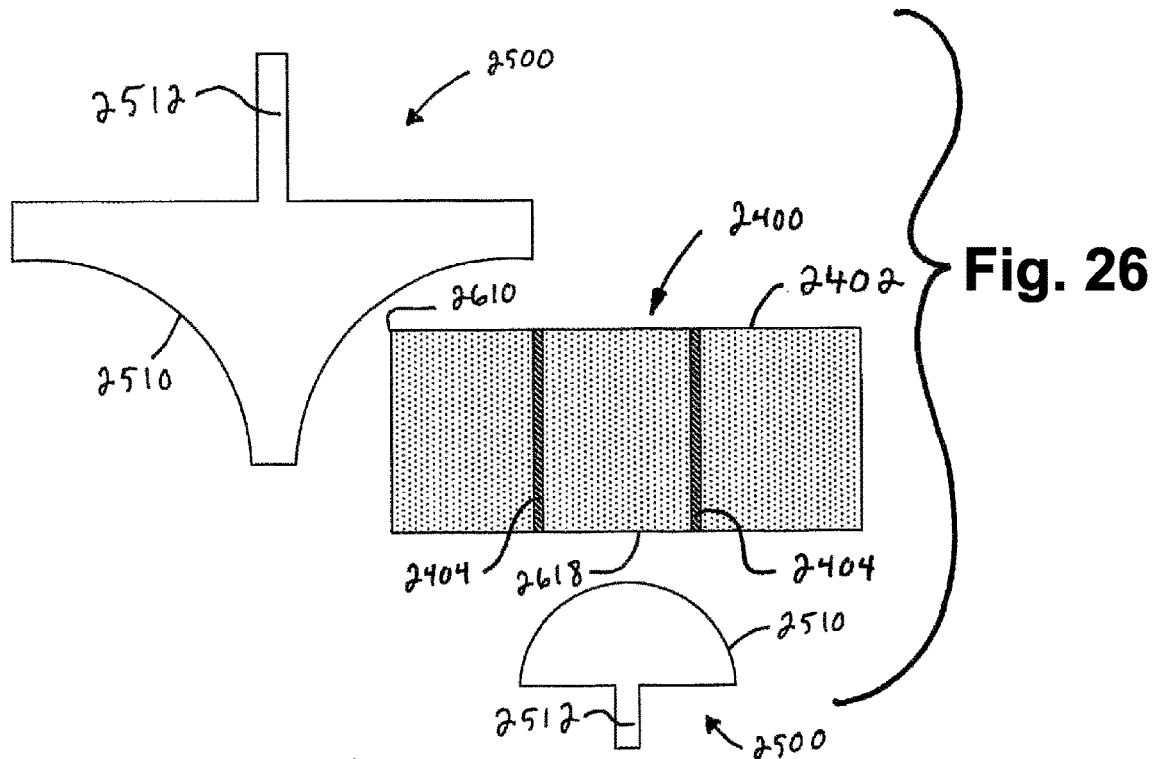
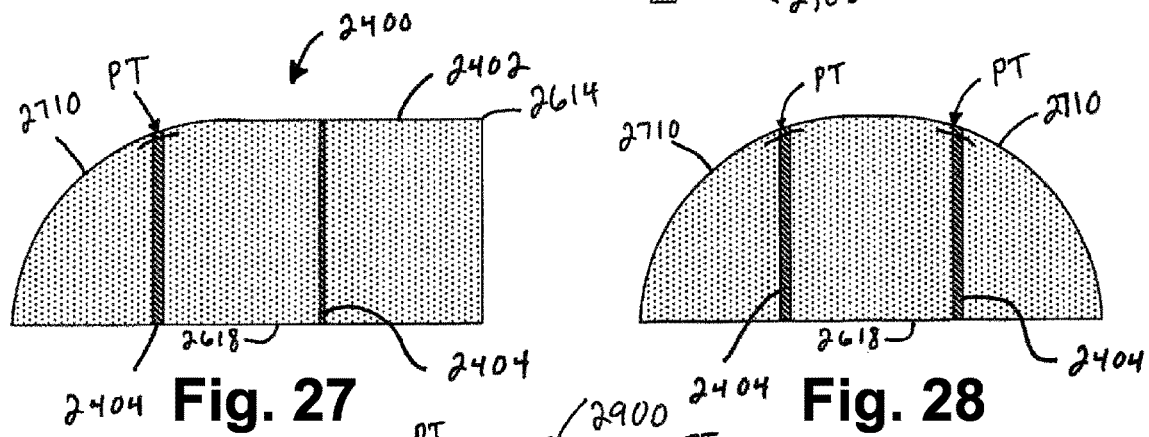
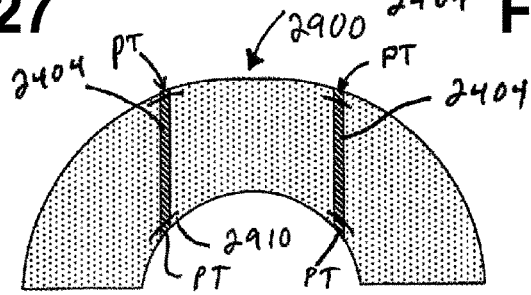
Fig. 26
Fig. 27
Fig. 28
Fig. 29

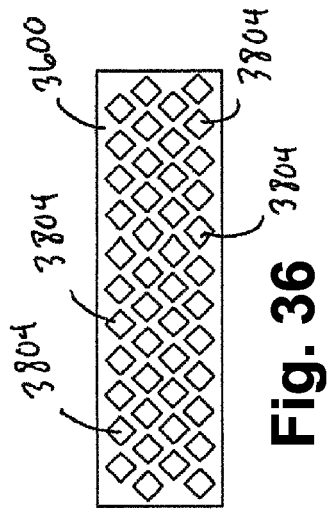
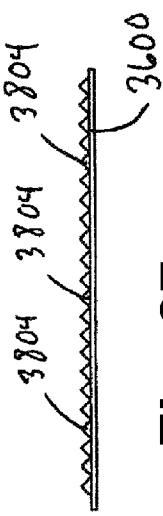
Fig. 36  Fig. 37
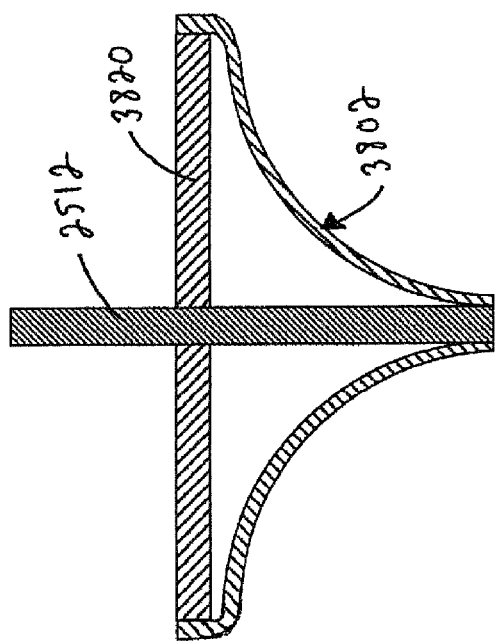
Fig. 35

LAMINATED FOAM PRODUCT AND METHODS FOR MAKING LAMINATED FOAM PRODUCTS

RELATED APPLICATIONS

The present application claims the benefit of provisional patent application No. 61/650,248, filed May 22, 2012, titled "Foam Board Laminator and Method for Laminating Foam Boards" which is incorporated herein by reference.

BACKGROUND

The present invention relates to polymeric rigid foam boards. It finds particular application in conjunction with polymeric rigid foam boards having a broad thickness range produced using a thermo-laminating process and will be described with particular reference thereto. It will be appreciated, however, that the invention is also amenable to other applications.

Engineered extruded polystyrene (XPS) foams have been proven useful in building insulation, and many construction applications. For example, XPS pipe fabrication foam billets are relatively dust free and provide thermal and moisture resistance as well as large format foam to operators for low-temperature cold processes. These engineered XPS applications usually need large format foam to be fabricated, however the extruded foam boards are limited in the thickness in conventional processes, such as less than 300 mm (~12"), or more likely less than 120 mm (~5"). It is difficult to extrude thicker products due to many engineering and operational obstacles (e.g., large die lip gaps that are needed in operation, which make it difficult to hold die pressure).

The present invention provides a new and improved apparatus and method for making relatively thicker XPS foam boards and foam products made from the thicker XPS foam boards.

SUMMARY

The present application discloses several different embodiments of thermally laminated foam boards, methods for making thermally laminated foam boards, apparatus for making thermally laminated foam boards, smaller foam pieces made from thermally laminated foam boards, methods for making smaller foam pieces from thermally laminated foam boards, parts made from thermally laminated foam boards, methods for making parts from thermally laminated foam boards, and tools for making parts from thermally laminated foam boards. In one exemplary embodiment, a foam product is made by thermally bonding at least two extruded polystyrene boards together to make a thick laminated board. The thick laminated board is machined to remove a portion of the extruded polystyrene and thereby form the foam product. The removed polystyrene is recycled.

In one exemplary embodiment, a foam product includes at least two extruded polystyrene boards bonded together two make a thick laminated board. A portion of the extruded polystyrene board is removed to form a shape of the foam product. The formed foam product consists of material of the polystyrene boards.

In one exemplary method of making a foam product, heat and pressure are applied to facing surfaces of a pair of opposed extruded polystyrene boards to flatten the facing surfaces by a factor of at least 2. The pair of extruded polystyrene boards are thermally bonded together to make a thick laminated board. The thick laminated board is machined to remove a portion of the extruded polystyrene and thereby form the foam product.

In one exemplary embodiment, a laminated foam board includes first and second extruded polystyrene boards each having an outer skin that is formed during extrusion of the polystyrene boards. The polystyrene boards are laminated together without removing the outer skin of faces that are bonded together. A bond area between each of the polystyrene boards is substantially planar and has a bond thickness variation of less than 0.020 inches.

In one exemplary method of making a foam product comprising at least two extruded polystyrene boards are bonded together to make a thick laminated board. The thick laminated boards are cut into smaller foam pieces. The smaller foam pieces are machined to remove a portion of the extruded polystyrene and thereby form the foam product. A profile tolerance where the smaller foam piece is machined across a thermal bond line between extruded polystyrene boards is less than or equal to 0.015 inches from one side of the bond line to the other.

In one exemplary embodiment, a rotary cutting tool for shaping foam products includes an annular support, cutting elements, and a base. The annular support is formed from sheetmetal. Cutting elements are secured to the sheetmetal annular support. A base is secured to the sheetmetal annular support for rotating the sheetmetal annular support and attached cutting elements.

In one embodiment, a system for laminating foam boards includes a waiting frame, a foam board laminator, and a receiving frame. The foam board laminator includes a heating frame and an adhering frame. The heating frame includes a heating element for heating a plurality of foam boards. The adhering frame includes a mechanism for applying pressure to the heated foam boards for laminating the foam boards together. The waiting frame positions the boards at an entrance of the heating frame, and the receiving frame receives the boards from an exit of the adhering frame.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

FIG. 4 is a Figure taken from U.S. Pat. No. 4,608,103;
FIG. 4A is a Figure taken from U.S. Pat. No. 4,608,103;
FIG. 4B is a Figure taken from U.S. Pat. No. 4,608,103.

FIG. 26 is a schematic illustration of tools positioned relative to a laminated foam piece;

FIG. 27 is a schematic illustration of a laminated foam piece after a first cutting operation with a tool;

FIG. 28 is a schematic illustration of a laminated foam piece after a second cutting operation with a tool;

FIG. 29 is a schematic illustration of a foam product that is formed after a third cutting operation with a tool;

FIG. 35 is a sectional view that illustrates the sheetmetal annular support assembled with an exemplary embodiment of a base;

FIG. 36 is a top view of an exemplary embodiment of a plurality of cutting elements adhered to a bonding material strip;

FIG. 37 is a side view of the plurality of cutting elements adhered to the bonding material strip illustrated by FIG. 36.

DETAILED DESCRIPTION OF ILLUSTRATED EMBODIMENT

Figure 1:
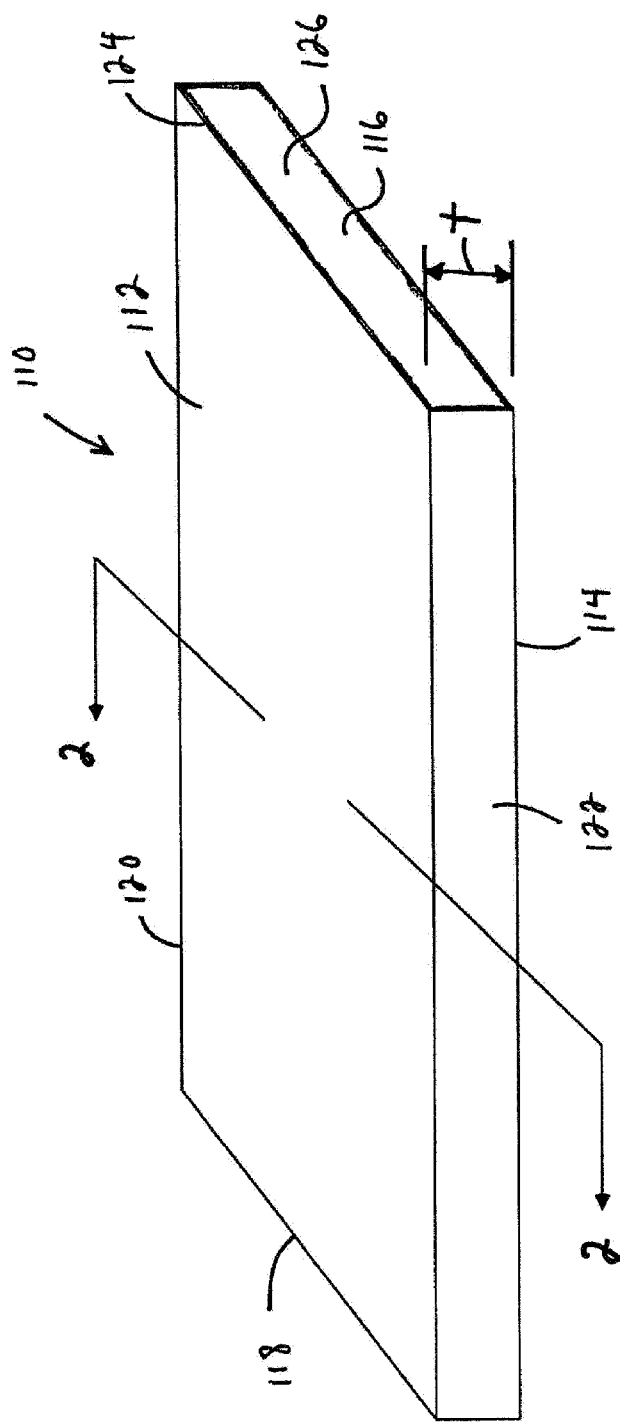
FIG. 1 is an illustration of an exemplary embodiment of an extruded polystyrene board.

FIG. 1 illustrates an exemplary embodiment of a foam board 110, such as an extruded polystyrene board. The foam board may be made from a wide variety of different materials. For example, the foam boards 110 can be made from a wide variety of different thermoplastic materials. In one exemplary embodiment, the foam board 110 is a polystyrene foam board, such as an extruded polystyrene foam board or an expanded polystyrene foam board. The illustrated foam board 110 is rectangular with first and second major face surfaces 112, 114, spaced apart by a thickness t. The foam board 110 has side edges 116, 118, 120, 122 that extend between the first and second major surfaces 112, 114. Both of the major surfaces 112, 114 may comprise a skin 124 that is formed during the extrusion process. The extrusion skin 124 is a stratum of polystyrene material that is denser than the interior foamed portion 126 of the board. That is, the thin extrusion skin is substantially solid whereas the foamed portion 126 comprises expanded foam cells. Examples of suitable foam boards 110 include the FOAMULAR® Extruded Polystyrene Insulation products that are available from Owens Corning.

In one embodiment, it is contemplated that the foam boards 110 are engineered extruded polystyrene (XPS) foams having a molecular weight of between about 100,000 to about 350,000. In one embodiment, the foam boards 110 have a molecular weight of between about 120,000 and about 150,000 from recycled expanded polystyrene. However, other foams are also contemplated in other embodiments. It is also contemplated that the foam boards 110 are sized to between about 600 mm to about 1524 mm wide× about 1200 mm to about 2769 mm long. The boards are also contemplated to be any sheet stock made of any thermoplastic polymer material.

Figure 2:
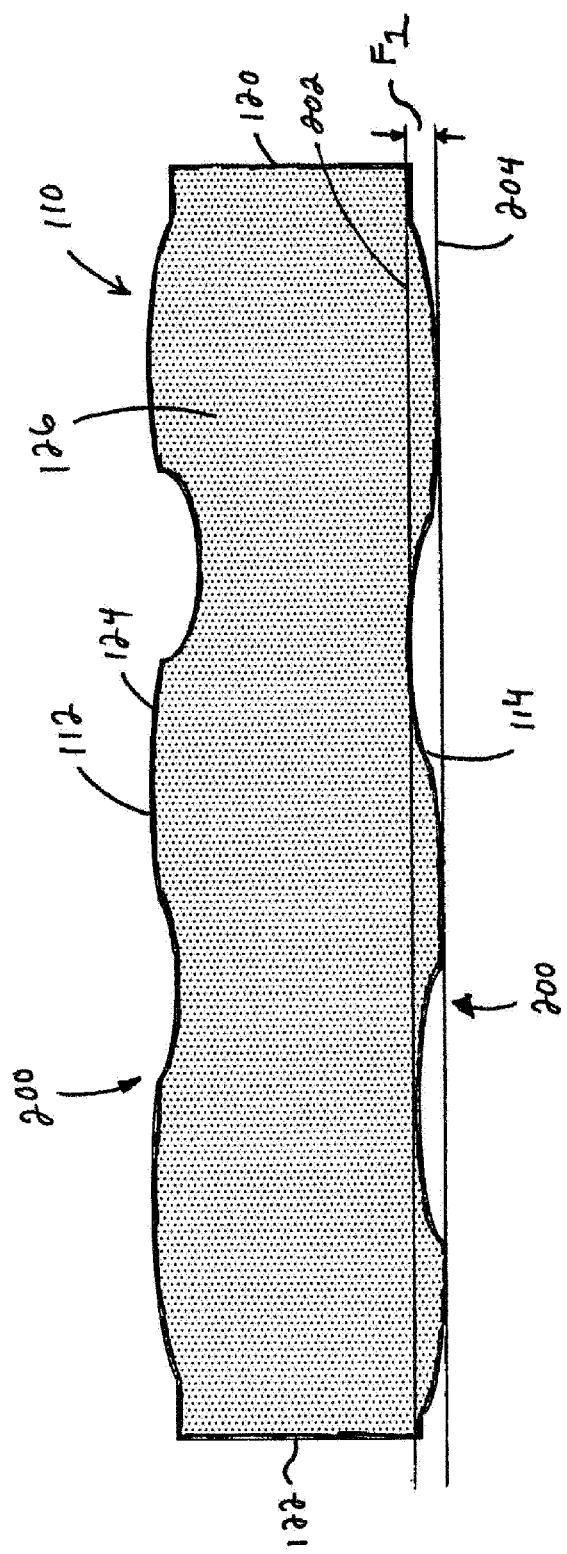
FIG. 2 is a sectional view of the extruded polystyrene board taken along the plane indicated lines 2-2 in FIG. 1.

FIG. 2 is a sectional view of the foam board 110. In one exemplary embodiment, the section lines 2-2 in FIG. 1 are normal to the direction in which the board 110 is extruded. That is, in this exemplary embodiment, the section 2-2 is across the width of the extruded foam board. FIG. 2 illustrates that there are typically surface variations 200 in the first and second major surfaces 112, 114 across the width of extruded polystyrene foam boards 110. The surface variations are exaggerated in FIG. 2 to make it clear that surface variations 200 are present.

In this application, flatness is the condition of a surface having all elements in one plane. In general, a flatness variation specifies a variation zone defined by two parallel planes within which the surface lies. In the example illustrated by FIG. 2, the flatness variation F1 is the distance between two parallel planes 202, 204 that the surface 114 lies between. In one exemplary embodiment, the flatness variation of the major surface 112 and/or the major surface 114 of a piece of a board 110 that is 2 feet wide by 2 feet long is greater than 0.020 inches, such as greater than 0.050 inches, such as between 0.050 and 0.10 inches, such as between 0.050 inches and 0.08 inches. The original board can be any size. In one exemplary embodiment, the flatness variation of the major surface 112 and/or the major surface 114 of a piece of a two inch thick board 110 that is 2 feet wide by 2 feet long is greater than 0.020 inches, such as greater than 0.050 inches, such as between 0.050 and 0.10 inches, such as between 0.050 inches and 0.08 inches. However, the board may have any width, thickness or length.

Figure 2A:
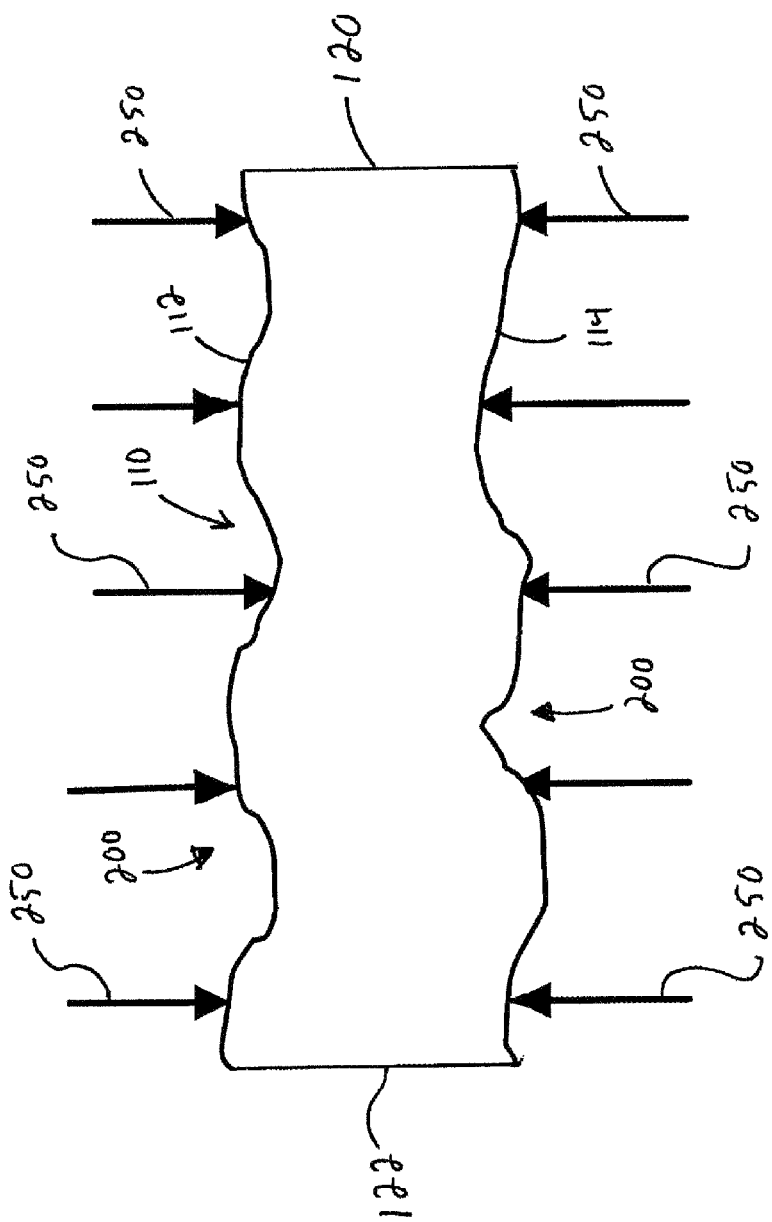
FIG. 2A is a sectional view of the extruded polystyrene board showing arrows at various points along the surface of the board where the thickness range of the board may be measured.

In another exemplary embodiment, the flatness variation F1 is estimated by measuring a thickness variation or range. Referring to FIG. 2A, the thickness range may be determined by measuring the thickness of the board 110 at various points along the surface of the board, indicated by arrows 250 in FIG. 2. The thickness variation is the difference between the maximum and minimum measured thickness. In one exemplary embodiment, the thickness range of a piece of a board that is 2 feet wide by 2 feet long is greater than 0.078, such as between 0.078 and 0.15 inches, such as about 0.125 inches. In one exemplary embodiment, the thickness range of a piece of a 2 inch thick board 110 that is 2 feet wide by 2 feet long is greater than 0.078, such as between 0.078 and 0.15 inches, such as about 0.125 inches. However, the board may have any width, thickness or length. In one exemplary embodiment, the initial flatness variation F1 of a board 110, that has not been flattened as will be described in more detail below, is estimated by dividing the thickness variation by two. This is based on the assumption that the flatnesses of the major surfaces are initially similar.

Figure 3:
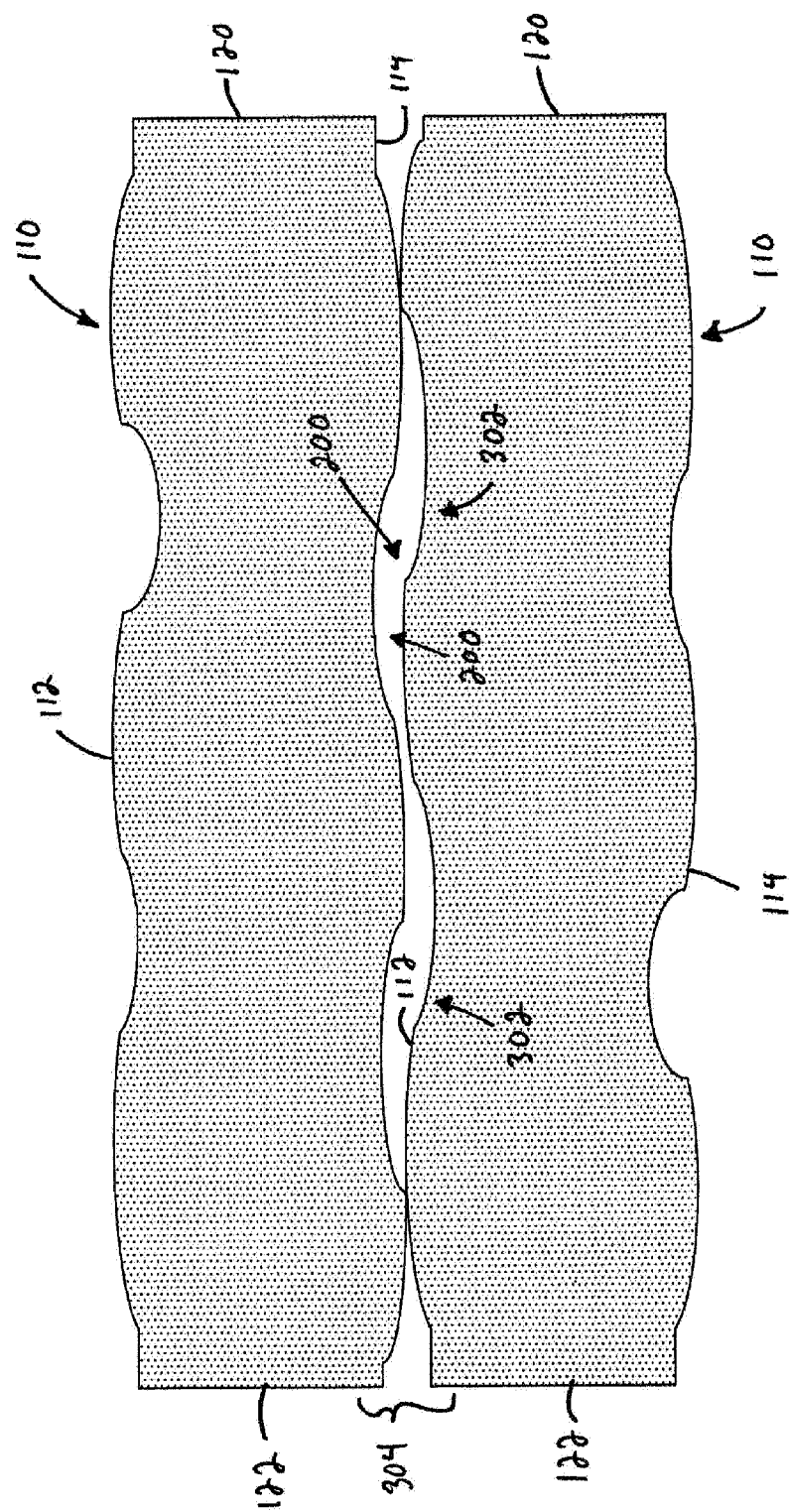
FIG. 3 illustrates a first polystyrene board stacked on top of a second polystyrene board.

FIG. 3 illustrates a first polystyrene board 110 stacked on top of a second polystyrene board 110. As is illustrated by FIG. 3, the abutment between the major surface 114 of the top board with the major surface 112 of the bottom board is not flush due to flatness variations of the major surfaces. As such, when polystyrene boards 110 having large flatness variations are heat laminated together using existing techniques, voids 302 would be expected to form between the two boards in the bond area 304. The two boards 110 would not be bonded together in the area of the voids 302. These voids/unbounded areas 302 would make heat laminated boards made using existing techniques unsuitable for some applications. For example, smaller foam pieces 2400 (See FIG. 24) used to make machined foam parts need to be void free, or the machined part will have unacceptable surface imperfections.

FIGS. 4, 4A, and 4B are taken from U.S. Pat. No. 4,608,103, which discloses an example of an existing technique for heat laminating two foam boards together. Referring to FIG. 4, the foam board 110 is fed into the apparatus on a platform defined by a series of rollers 426 which support the board 110 in a horizontal plane.

In the prior art FIG. 4 example, the forward end of the bottom or lower board is positioned under an elongated flat stainless steel heating strip or blade 430 which extends horizontally across the width of the foam board 110 and has opposite end portions attached to a pair of horizontal support plates 432. The plates 432 also support a spreader member or bar 436 which is spaced with the heating blade 30 above the support rollers 426 by a distance slightly greater than the thickness of the foam board 110.

In the prior art FIG. 4 example, each of the plates 432 is supported by a pair of machine screws 439 which are threaded into corresponding nuts secured to an angle member 442. Another pair of nuts are threaded onto the screws 439 for vertical adjustment and support the corresponding plate 432 so that it may move or float vertically by a predetermined distance according to the position of the nuts below the heads of the screws 439. The vertical spacing of the blade 430 and the bar 436 above the rollers 426 may be adjustably selected according to the thickness of the lower foam board 416, by means of the machine screws 439.

In the prior art FIG. 4 example, the spreader bar 436 forms a support for the upper foam board when the board is inserted into the apparatus and positioned directly above the lower foam board in vertical alignment. The spreader bar 436 is positioned slightly above the level of the heating blade 430 so that the forward end of the upper foam board does not contact the heating blade 430 when the foam board is first positioned within the apparatus directly above the lower foam board. A pair of vertically spaced pressure members or rolls 450 are positioned above and below the heating blade 430, and are driven in opposite directions. The drive system or mechanism for the rolls 450 provides for adjusting the upper rolls 450 in a vertical plane in order to vary the spacing or gap defined between the rolls 450. The speed of the motor 452 is selected according to the desired processing rate, and a controller 456 is connected by conductors to a temperature sensing element or thermocouple recessed within the leading edge of the heating blade 430.

In operation of the prior art apparatus illustrated by FIG. 4, for heat-fusing or welding the lower side surface of the upper foam board to the upper side surface of the lower foam board, the rolls 450 are adjusted to define a gap 454 which is slightly less than the combined thicknesses of the foam boards. The heating blade 430 is energized to a predetermined temperature, for example, 500° F. The foam boards are then advanced forwardly until the leading ends of the boards enter the gap 454 which causes the opposing side surfaces of the foam boards to contact the upper and lower sides of the heating blade 430. The temperature of the blade 430 is selected to soften the skin or surface portions of the foam boards after which the softened surfaces are pressed together by the rolls 450.

As the driven rolls 450 feed the foam boards through the gap 454, the opposing side surfaces of the boards are uniformly heated by the blade 430 along the full length of the boards and are then fused together to form the interface or bond area 304. Since the thickness of each foam board varies somewhat along its length, for example, by plus or minus 1/16 inch, the heating element or blade 430 is permitted to shift or float vertically as a result of the movement of the support plates 432 on the screws 439.

Prior art U.S. Pat. No. 4,608,103 alleges that a uniform pressure contact is made against the heating blade 430 by each of the foam boards. Prior art U.S. Pat. No. 4,608,103 also alleges that this provides for a uniform and dependable weld at the interface 304 by assuring uniform heating and softening of the opposing side surfaces of the foam boards. Applicant believe that the arrangement disclosed by prior art U.S. Pat. No. 4,608,103 cannot provide a uniform pressure contact along the entire width of two foam boards that each have substantial flatness variations, since the heating blade 430 can only follow the contour of one of the foam boards, not both. As such, the single heating blade 430 arrangement disclosed by Prior art U.S. Pat. No. 4,608,103 cannot provide for a void-free weld between foam boards that have substantial flatness variations, such as the boards illustrated by FIG. 3 and described above.

Figure 6:
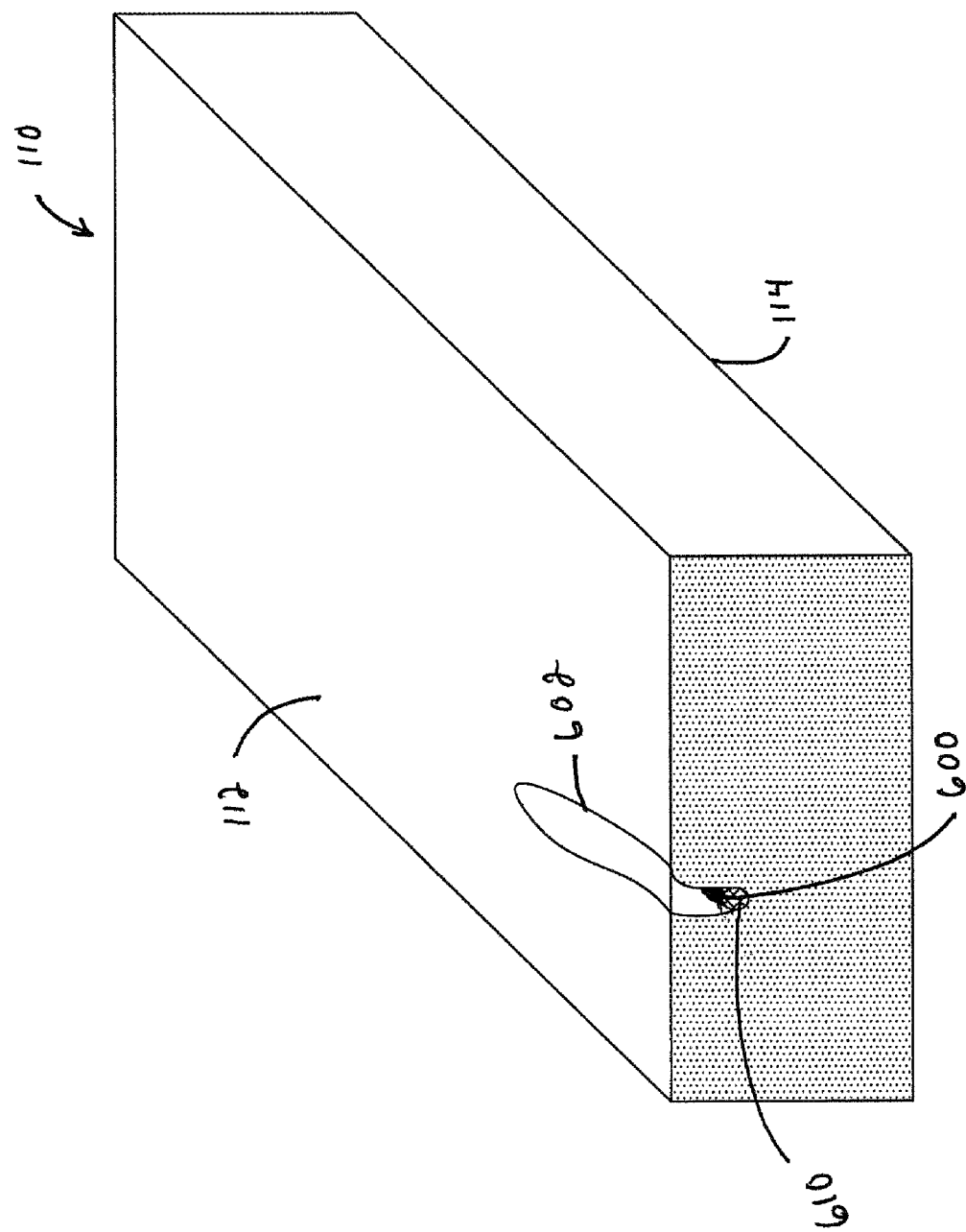
FIG. 6 is a sectional view taken along the plane indicated by lines 6-6 in FIG. 5.

Applicant has found that in arrangements where foam boards pass against a stationary heating element (Similar to the heating blade illustrated by FIGS. 4, 4A, and 4B), melted foam material 600 (See FIGS. 4, 4B and 6) has a tendency to accumulate on the heating stationary heating element. Once an excessive amount of material 600 accumulates on the stationary heating element, the material 600 drips off of the heating element and drips onto the lower of the two boards 110 that are being laminated together. This hot material 600 melts trenches 602 that resemble "worm hole" into the foam material of the lower of the two boards 110. The hot material 600 cools and forms an area 610 of material that is much harder and much denser than the other foam material at the same depth.

In addition to the voids/unbonded areas 302, the trenches 602 and areas 610 of harder and denser material make heat laminated boards made using existing techniques unsuitable for some applications. For example, as will be described in more detail below, smaller foam pieces 2400 (See FIG. 24) used to make machined foam parts need to be void free or the machined part will have unacceptable surface imperfections. In addition, the location of higher density material of laminated foam pieces must be known and accounted for, or cutting operations will result in unacceptable surface imperfections. The location and depth of the trenches 602 and areas 610 of harder/denser material is random and therefore unpredictable. As such, the areas 610 of harder/denser material cannot be accounted for in a cutting operation, When a saw blade or other cutting tool unexpectedly hits one of the areas 610 of harder/denser material, a surface imperfection occurs and/or the part is otherwise damaged.

Figure 7:
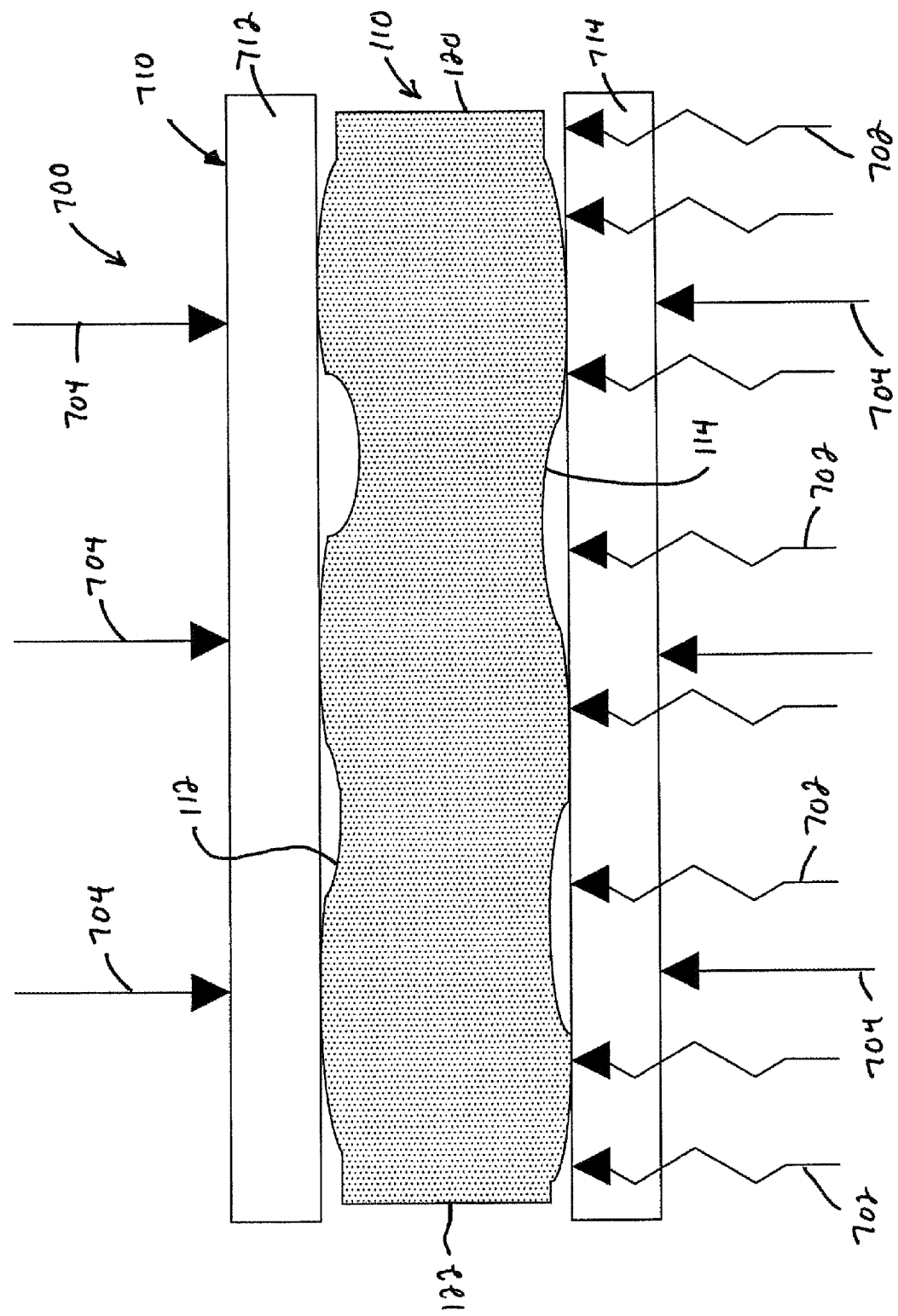
FIG. 7 is a schematic illustration of an exemplary embodiment of an apparatus for flattening a major surface of a foam board.

FIG. 7 is illustrates an exemplary embodiment of an apparatus 700 for flattening a major surface 112 or 114 of a foam board 110. In the illustrated embodiment, the apparatus 700 flattens only one major surface 114 of the foam board 110. In another exemplary embodiment, the apparatus 700 flattens both major surfaces 112, 114 of the foam board 110. In the illustrated embodiment, the apparatus 700 applies heat (indicated by arrows 702) and pressure (indicated by arrows 704) to the foam board 110 to flatten the major surface 114.

The pressure may be applied to the foam board 110 in a wide variety of different ways. In the example illustrated by FIG. 7, the pressure is applied to the foam board 110 by a clamping device 710. The illustrated clamping device includes an upper clamp member 712 and a lower clamping member 714. The upper clamp member 712 applies pressure to the major surface 112 and the lower clamp member 714 applies pressure to the major surface 114. The upper and lower clamp members can take a wide variety of different forms. For example, when the board is moved through the apparatus 700 during the flattening, the upper and lower clamp members 712, 714 may comprise rollers and/or belts, which may be driven by a motor. If the board is stationary during the flattening operation, the clamp members 712, 714 may comprise plates that are sized to engage the entirety of the major surfaces 112, 114.

The heat may be applied to the major surface 114 in a wide variety of different ways. The heat may be applied to the major surface 114 before the application of pressure, during the application of pressure, and/or after the application of pressure. In one exemplary embodiment, the heat is applied to the major surface 114 by one or more heating elements that are contained in the lower clamp member 714. The heating elements can take a wide variety of different forms. The heating element can utilize electricity, a heated fluid, such as oil, water, or other liquids that are provided to the heating element and/or a fuel to provide the heat to the major surface 114. If both sides of the board 110 are to be flattened, the same heating type of heating element can be provided on both sides of the board 110 by the apparatus 700.

Figure 8:
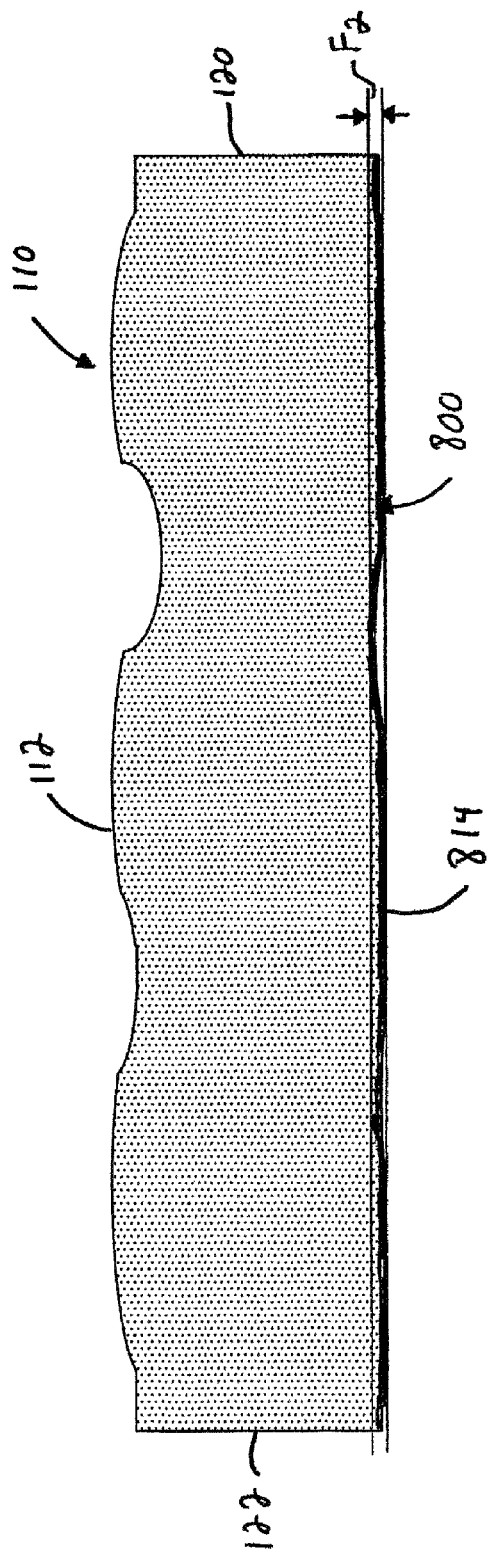
FIG. 8 is a schematic illustration of an exemplary embodiment of a foam board having a flattened major surface.

FIG. 8 illustrates the foam board 110 shown in FIG. 2 that has been flattened in accordance with the teachings of the present application to provide a flattened major surface 814. As can be seen by comparing FIG. 8 with FIG. 2, the flattened major surface 814 has a much smaller flatness variation than the unprocessed major surface 114. For example, the major surface 814 may be flatter that the major surface 114 by a factor of two, a factor of 4, a factor of 10, or even more comparatively flatter than an unprocessed extruded polystyrene board. In one exemplary embodiment, the flatness variation of the major surface 112 and/or the major surface 114 of a piece of a board 110 that is 2 feet wide by 2 feet long is less than 0.040 inches, such as less than 0.030 inches, such as less than 0.020 inches, such as less than 0.010 inches, such as less than 0.050 inches. In one exemplary embodiment, the flatness variation of the major surface 112 and/or the major surface 114 of a piece of a board 110 that was originally 2 inches thick, that is 2 feet wide by 2 feet long is less than 0.040 inches, such as less than 0.030 inches, such as less than 0.020 inches, such as less than 0.010 inches, such as less than 0.005 inches. However, the board may have any width, thickness or length.

Referring again to FIGS. 8 and 2, in one exemplary embodiment the flattened board has a much smaller thickness variation than the unprocessed board. The thickness variation in FIG. 8 can be measured in the same manner as in FIG. 2A. In one exemplary embodiment, the thickness range of a piece of a board (flattened on one side) that is 2 feet wide by 2 feet long is less than 0.078, such as less than 0.062 inches, such as less than 0.031 inches. In one exemplary embodiment, the thickness range of a piece of a 2 inch thick board that is 2 feet wide by 2 feet long is less than 0.078, such as less than 0.062 inches, such as less than 0.031 inches. However, the board may have any width, thickness or length.

In one exemplary embodiment, the processed flatness variation F2 of a flattened major surface of a board that has been flattened on one side is calculated by the following equation:

$$F2=(T1/2)-T2 \text{ where:}$$

F2 is the processed flatness variation;
T2 is the processed thickness variation; and
T1 is the original thickness variation.

For example, if a board 110 has an initial thickness variation of 0.126 inches and a thickness variation of 0.059 after processing as described with respect to FIG. 8, the flatness variation F2 is 0.004 inches (0.126/2−0.059). This calculation of the flatness variation assumes that the initial surface imperfections are of the same size on the top and bottom major surfaces and therefore contribute equally to the initial thickness variations of the board. That is, the initial flatness variation F1 is the same on the top major surface as the bottom major surface.

Figure 9:
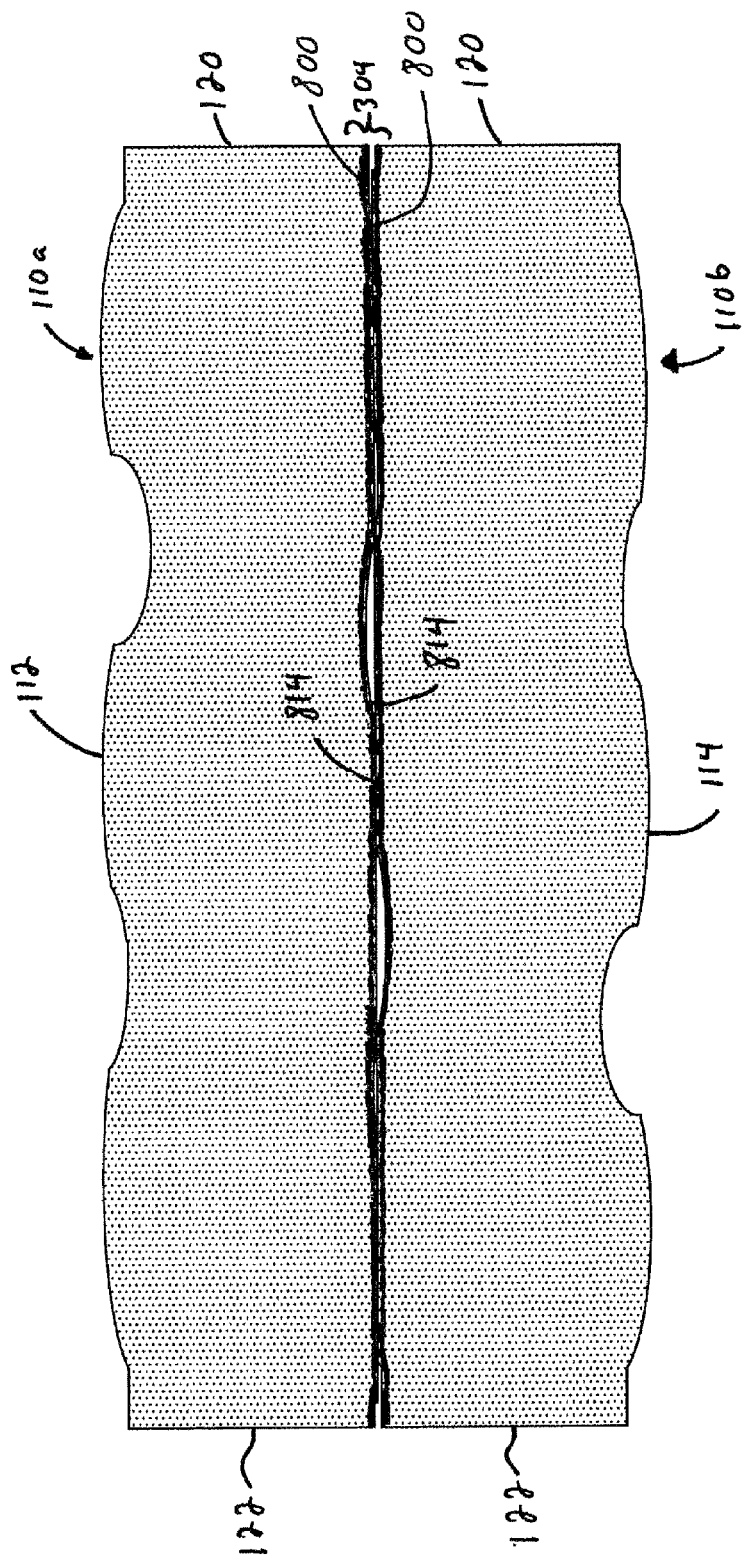
FIG. 9 illustrates an exemplary embodiment of a first foam board stacked on top of a second foam board with flattened major facing surfaces.

Referring to FIG. 8, the heating and application of pressure produces a layer 800 of molten material (temporarily, until the material cools and solidifies). This layer 800 of molten material on the flattened major surface 814 allows the boards to be heat laminated together without using an external adhesive and such that the adhesion of the boards is uniform across over the entirety of the facing major surfaces. FIG. 9 illustrates a first polystyrene board 110 having a flattened major surface 814 stacked on top of a second polystyrene board 110 having a flattened major surface 814. As is illustrated by FIG. 9, the abutment between the flattened major surface 814 of the top board with the flattened major surface 814 of the bottom board is substantially flush due to the abutting major surfaces 814 being substantially flat. As such, when polystyrene boards 110 are heat laminated together, the voids 302 (See FIG. 3) are eliminated between the two boards in the bond area 304 (See FIG. 13). The elimination of the voids/unbounded areas 302 makes heat laminated foam boards suitable for some applications, such as foam pieces 2400 (See FIG. 24) used to make machined foam parts.

Figure 10:
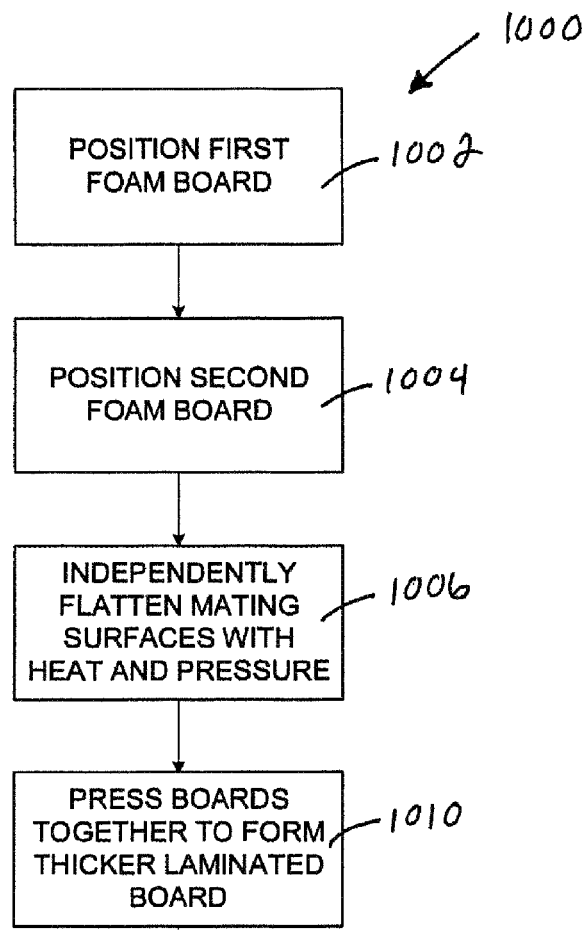
FIG. 10 is a flowchart that illustrates an exemplary embodiment of a method of making a laminated foam board.
Figure 11:
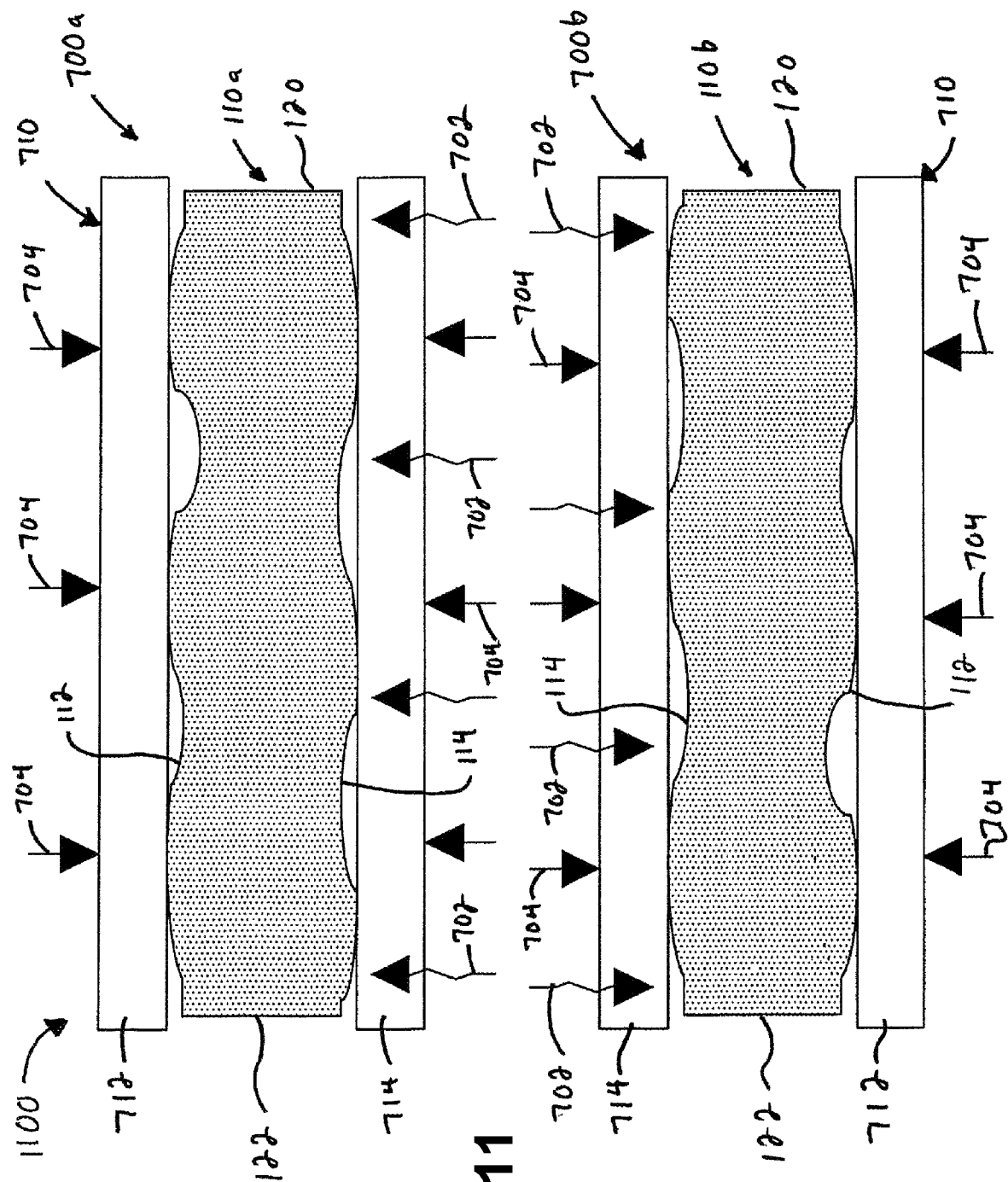
FIG. 11 is a schematic illustration of an exemplary embodiment of an apparatus for simultaneously flattening a opposing major surfaces of a pair of foam boards.
Figure 12:
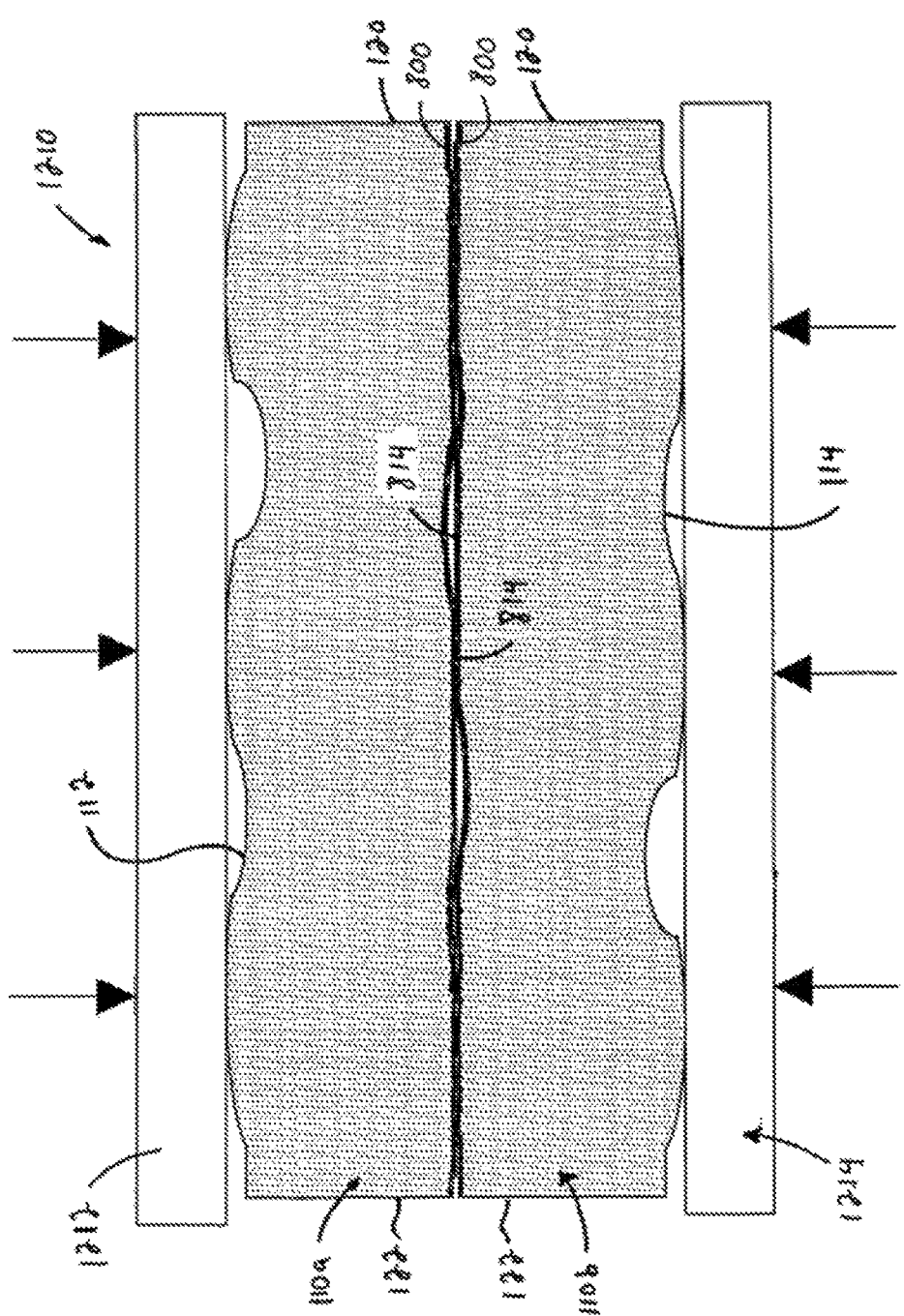
FIG. 12 is a schematic illustration of an exemplary embodiment of an apparatus for pressing the foam boards illustrated by FIG. 11 together to form a laminated foam board.
Figure 13:
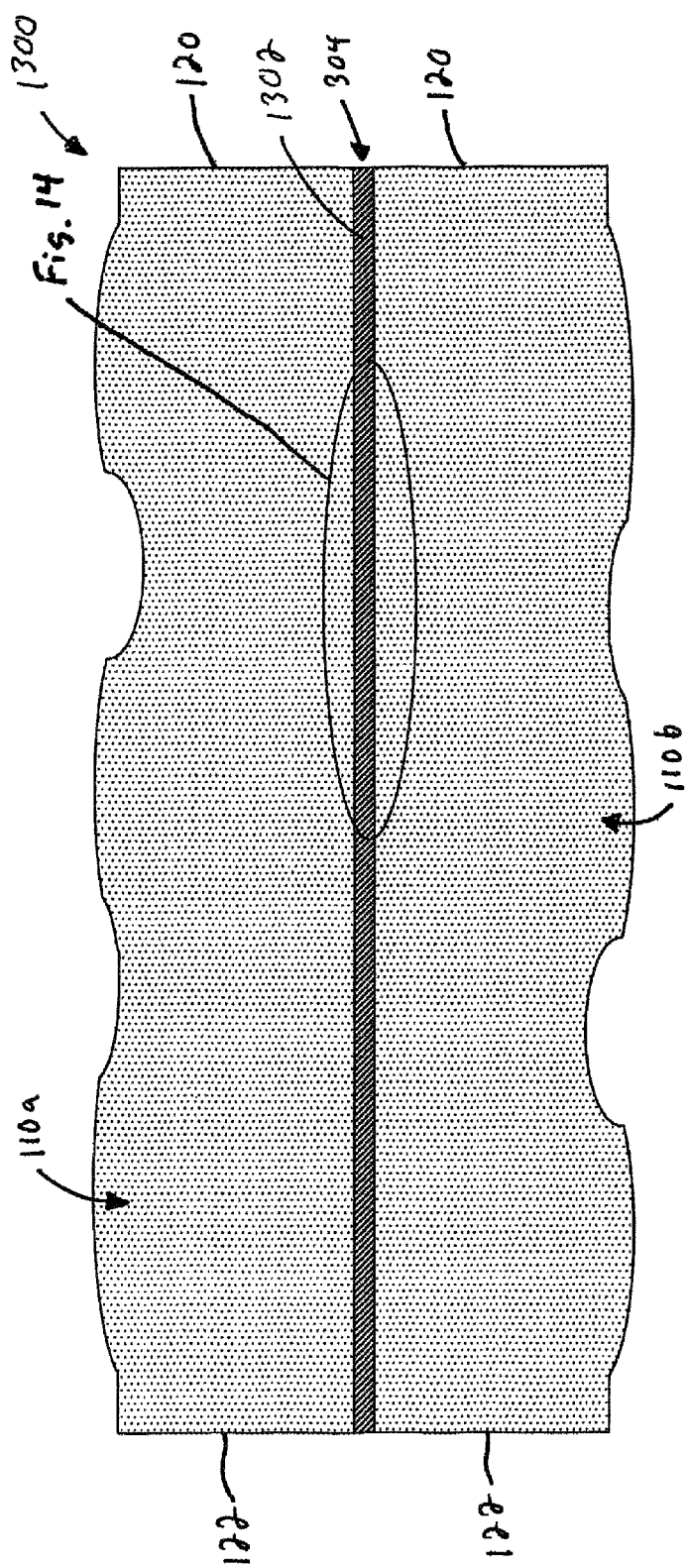
FIG. 13 is a sectional view of an exemplary embodiment of a laminated foam board made by the apparatuses illustrated by FIGS. 11 and 12.
Figure 18:
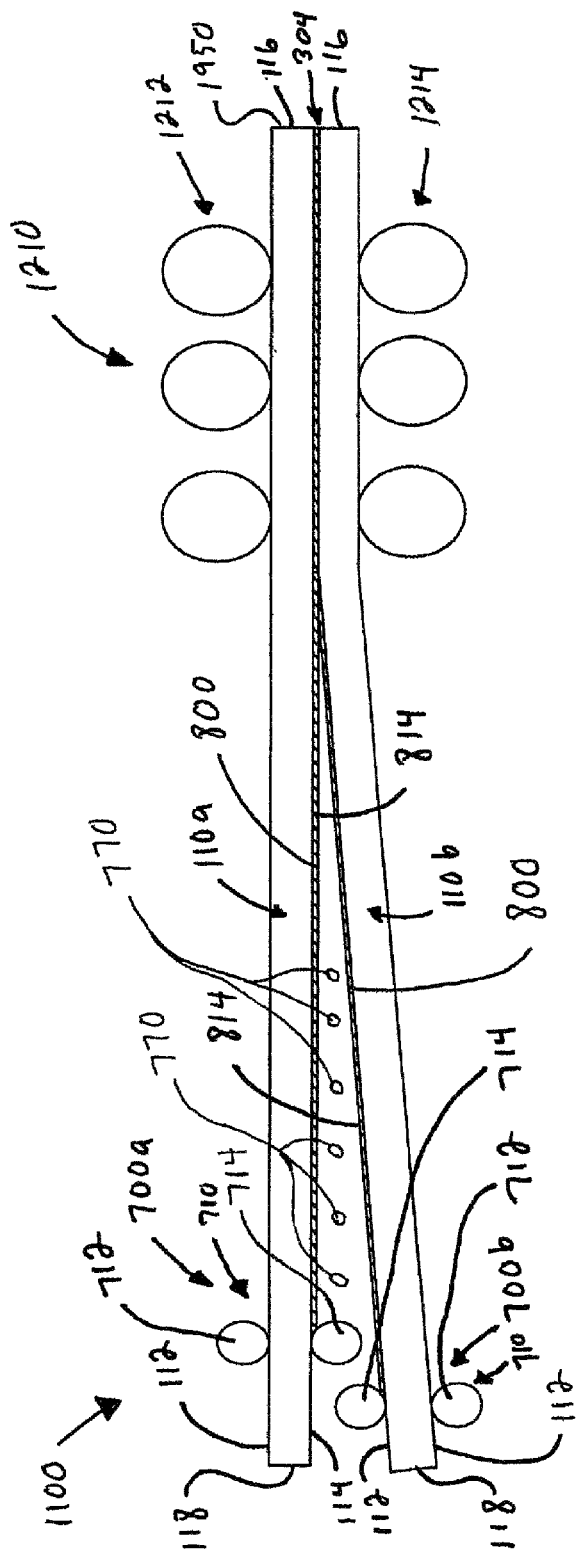
FIG. 18 is a schematic illustration of an exemplary embodiment of an apparatus for flattening opposing surfaces of a pair of foam boards and pressing the foam boards together.

FIG. 10 is a flowchart that illustrates an exemplary embodiment of a method 1000 of making a heat laminated foam board 1300 (See FIG. 13). FIGS. 11, 12 and 18 illustrate examples of apparatus that can be used to perform the method and make a heat laminated foam board 1300. According to the method, first and second boards 110*a*, 110*b* are positioned (steps 1002, 1004) relative to one another such that the major surface surfaces of the boards are substantially aligned. In the examples illustrated by FIGS. 11 and 18, a first foam board 110*a* is positioned above a second foam board 110*b*.

Referring to FIG. 10, a major surface 112 or 114 of each board is independently flattened 1006. That is, the flattening of the major surface 114 of the first board 110*a* is separate and independent from the flattening of the major surface 112 of the second board 110*b*. In the example illustrated by FIG. 11, an independent flattening arrangement 1100 comprises two of the apparatuses 700 illustrated by FIG. 7. An upper flattening apparatus 700*a* flattens the bottom major surface 114 of the first board 110*a*. In the illustrated embodiment, the lower flattening apparatus 700*b* is the same as the upper flattening apparatus 700*b*, except it is flipped over (i.e. the heated member 714 is on the top and the non-heated member is on the bottom. The lower flattening apparatus 700*b* flattens a major surface 112 or 114 of the second board 110*b*.

In the example illustrated by FIG. 18, each of the upper and lower flattening apparatuses 700*a*, 700*b*, comprise a heated clamping member 714, in the form of a roller, and a clamping roller 712 that is not heated. In the exemplary embodiment illustrated by FIG. 18, the apparatus 1100 includes optional downstream heating elements 770. The rollers 714, 712 clamp against the boards 110*a*, 110*b* to flatten the major surface 114 of the board 110*a* and the major surface 114 of the board 110*b*. In the illustrated exemplary embodiments, the flattening of each of the two board is achieved using heat and pressure. The optional downstream heating elements 770 are positioned between the flattened surfaces 814. The heating elements 770 apply heat to control the temperature of the layer 800 of molten material. The heating elements 770 can take a wide variety of different forms. The optional heating elements 770 can take any form that allows the temperature of the layer 800 of molten material to be controlled and kept in a melted state until the boards 110*a*, 110*b* reach the pressing apparatus 1210. In the illustrated embodiment, the heating elements 770 are elongated rods that are spaced apart from the flattened surfaces 814, downstream from the rollers 714. However, the heating elements can have other shapes, such as plates. In one exemplary embodiment, the heating elements 770 span the width of the boards 110, 110*b*. In one exemplary embodiment, the heating elements 770 are individually controllable.

In one exemplary embodiment, the flattened surfaces 814 of the boards produced according to the method 1000 are flattened by a factor of two, a factor of four, a factor of 10, or even more comparatively flatter than an unprocessed extruded polystyrene board. In one exemplary embodiment, the flatness variation of the major surface 814 of a piece of a board 110 that is 2 feet wide by 2 feet long is less than 0.040 inches, such as less than 0.030 inches, such as less than 0.020 inches, such as less than 0.010 inches, such as less than 0.050 inches. In one exemplary embodiment, the thickness variation range of a piece of a board (flattened on one side) that is 2 feet wide by 2 feet long is less than 0.078, such as less than 0.062 inches, such as less than 0.031 inches.

Figure 5:
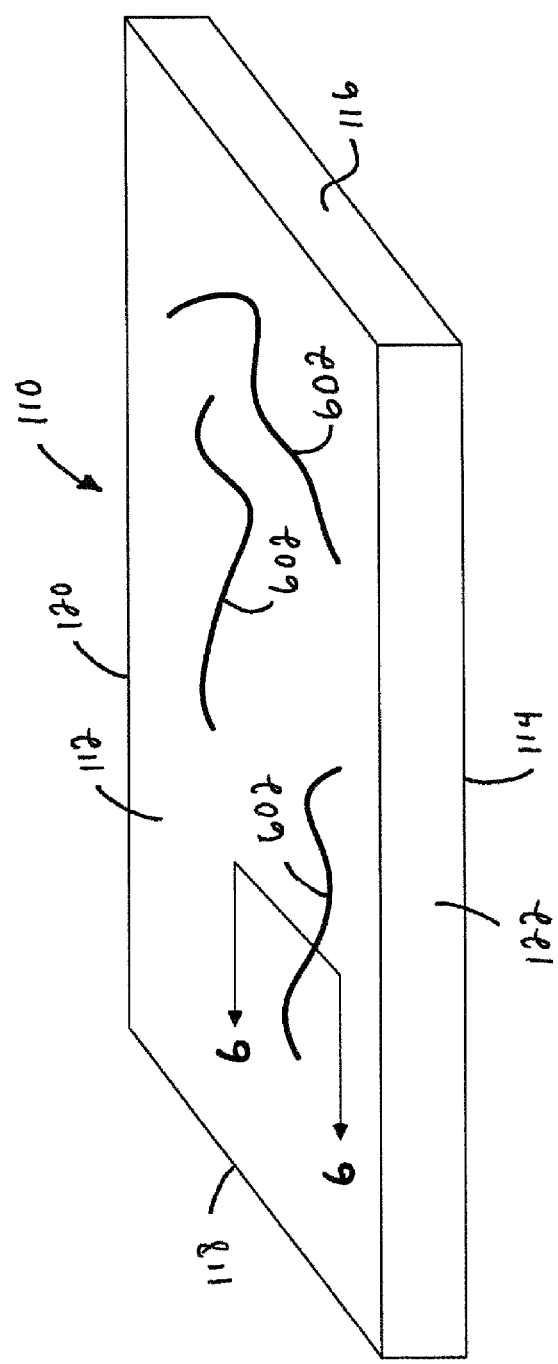
FIG. 5 is a schematic illustration of an individual foam board that has been separated from a laminated foam board according to the method illustrated by FIGS. 4, 4A, and 4B.

In an exemplary embodiment, the outer skin 124 is not removed during the independent flattening step 1006. In an exemplary embodiment, a layer of molten material 800 is formed on the flattened surfaces 814. In the example illustrated by FIG. 18, the heated rollers 714 becomes coated with the molten board material 800. After an initial, start-up or priming of the heated roller 714, the heated roller 714 attains a steady state. That is, the rate at which molten board material 800 is deposited on the roller 714 equals the amount of molten material that leaves the heated roller 1114 and is deposited on the flattened surface 814. As such, the trenches 602 and areas 610 shown in FIGS. 5 and 6 do not form.

Referring to FIGS. 10, 12, and 18, the boards 110*a*, 110*b* are pressed together 1010 to form the thicker laminated board 1300. In the examples illustrated by FIGS. 12 and 18, the flattened surfaces 814 are pressed together. The molten material 800 fills any remaining flatness variations in the board surfaces 812. When the molten material 800 cools, the material solidifies to uniformly bond the two boards 110*a*, 110*b* together across the flattened surfaces 814. FIG. 13 illustrates the formed laminated board 1300.

The boards 110*a*, 110*b* may be pressed together in a wide variety of different ways. In the example illustrated by FIG. 12, the pressure is applied to the boards 110*a*, 110*b* by a clamping device 1210. The illustrated clamping device includes an upper clamp member 1212 and a lower clamping member 1214. The upper clamp member 1212 applies pressure to the board 110*a* and the lower clamp member 1214 applies pressure to the board 110*b*. The upper and lower clamp members can take a wide variety of different forms. For example, when the board is moved through the clamping device 1210, the upper and lower clamp members 1212, 1214 may comprise rollers, flat plates, belts or a combination thereof. If the board is stationary during pressing operation, the clamp members 1212, 1214 may comprise plates that are sized to press the entirety of the boards 110*a*, 110*b* together. In the example illustrated by FIG. 18, the clamping device 1210 comprises rollers. The clamp members 1212, 1214 clamp against the boards 110*a*, 110*b* together to form the thicker laminated foam board 1300.

Figure 14:
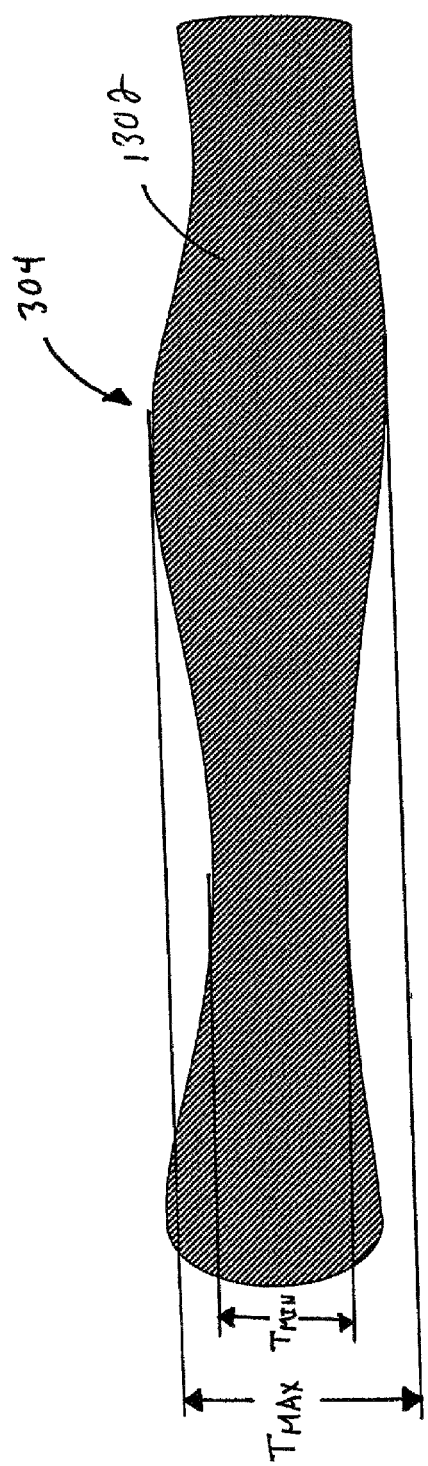
FIG. 14 is an enlarged portion of an exemplary embodiment of a bond line of the laminated foam board as indicated by reference FIG. 14 in FIG. 13.

FIG. 13 illustrates the formed laminated board 1300 and FIG. 14 illustrates and enlarged portion of FIG. 13 that illustrates a bond area 304 between the polystyrene boards. In FIG. 14, the variations in thickness of the bond area are highly exaggerated to illustrate the variation. In an exemplary embodiment, the combination of the independent flattening of the surfaces 814 and the uniform distribution of the molten material 800 by the rollers 714 across the surfaces 814 results in a very small bond thickness variation. That is, the thickness of the denser material 1302 that forms the bond between the two boards varies by only a small amount. The bond thickness variation is shown in FIG. 14 as the difference between the minimum thickness $T_{MIN}$ and the maximum thickness $T_{MAX}$ of the bond material. In one exemplary embodiment, the bond area between each of the polystyrene boards is substantially planar and the bond thickness variation is less than 0.020 inches, or less than 0.015 inches. In one exemplary embodiment, the average bond thickness is between 0.015 and 0.045 inches, such as between 0.020 and 0.040 inches, such as between 0.025 and 0.035, such as about 0.030 inches, with a corresponding bond thickness variation of less than 0.020 inches, or less than 0.015 inches.

Figure 14A:
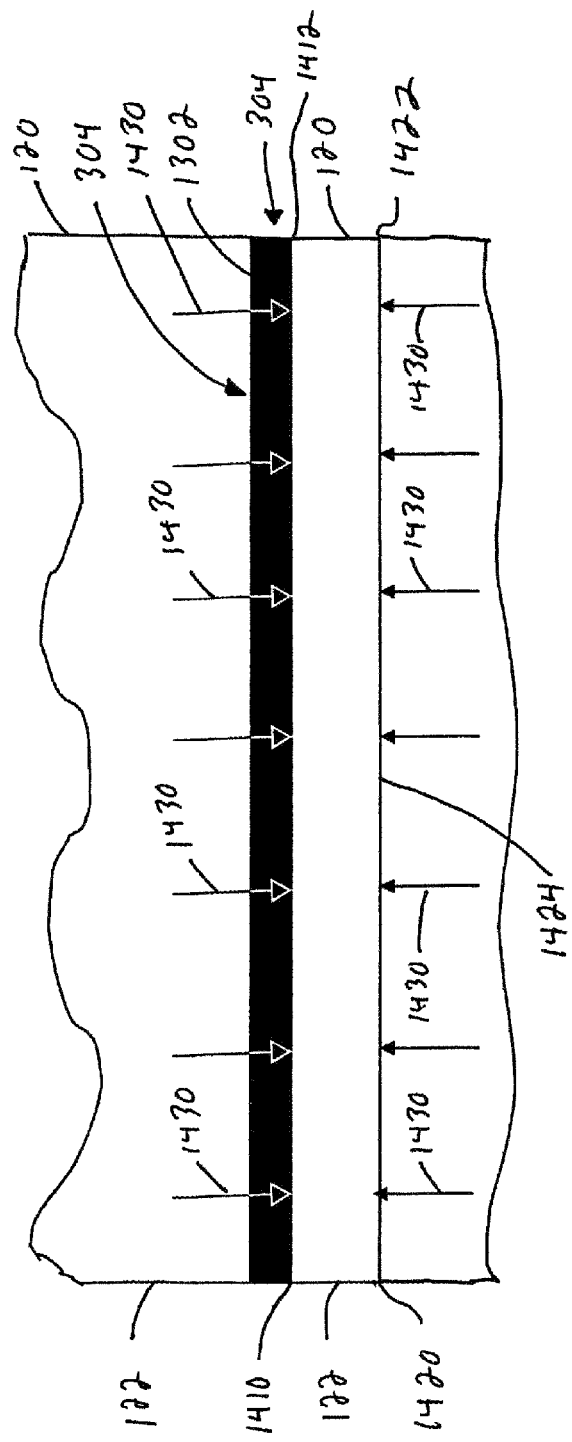
FIG. 14A is a sectional view of an exemplary embodiment of a laminated foam board illustrating a method of measuring variations of a bond area.

FIG. 14A illustrates another method for measuring variations in the bond area. In the example illustrated by FIG. 14A, the laminated board 1300 is cut to expose the plane illustrated by FIG. 14A. Points 1410 and 1412 on the bottom of the bond area 304 at the edges 122, 120 of the board are identified. Points 1420 and 1422 are marked a fixed distance below the points 1410 and 1412. A reference line 1424 is drawn between the points 1420 and 1422. The sample may be cut along the line 1422. Distances indicated by pairs of arrows 1430 are measured. In one exemplary embodiment, the variation (i.e. the difference between the maximum distance and the minimum distance) between the distances 1430 is less than 0.100 inches, less than 0.075 inches, less than 0.050 inches, or less than 0.020 inches.

Figure 15:
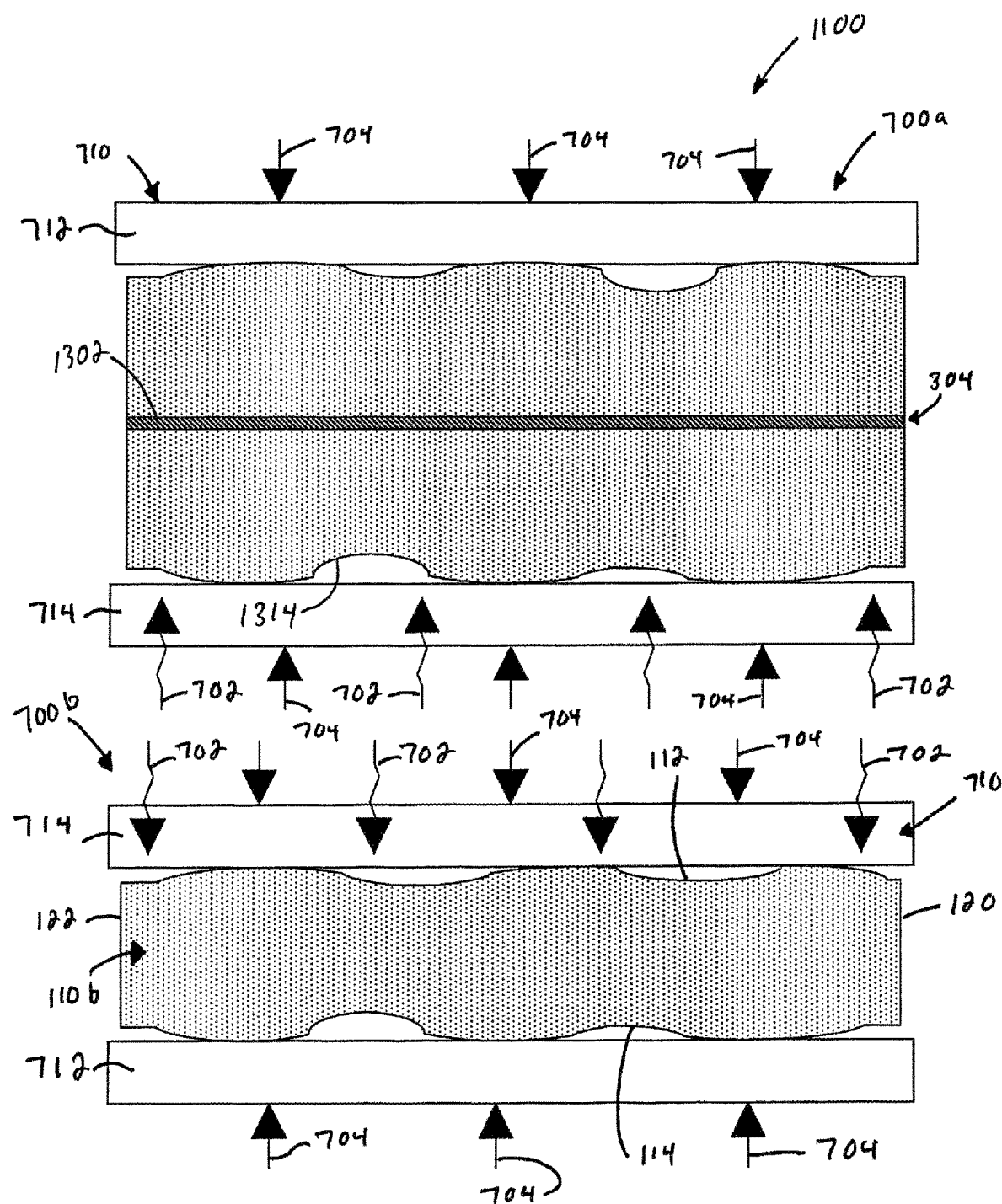
FIG. 15 is a schematic illustration of an exemplary embodiment of an apparatus for simultaneously flattening a opposing major surfaces of a foam board and a laminated foam board.
Figure 16:
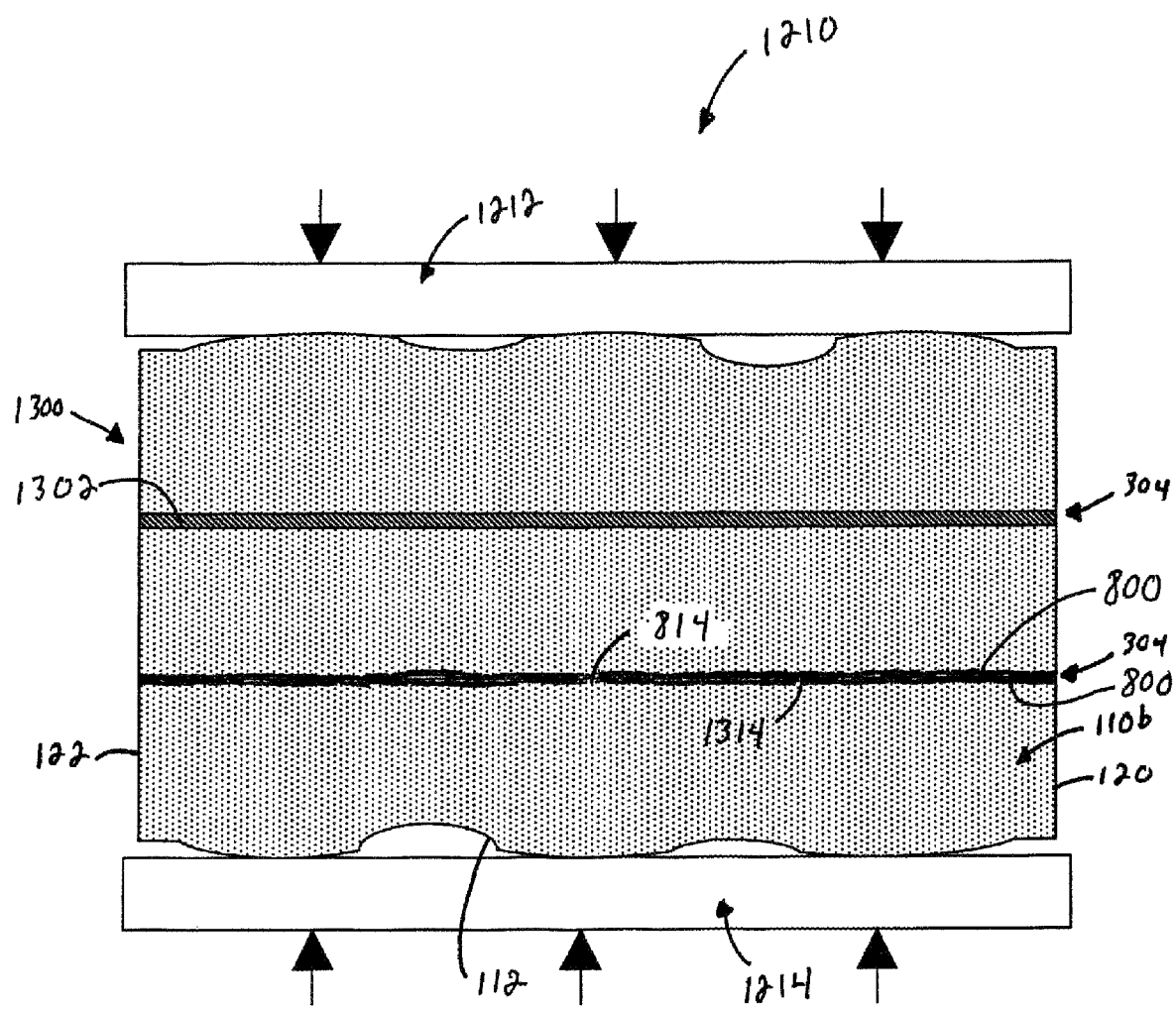
FIG. 16 is a schematic illustration of an exemplary embodiment of an apparatus for pressing the foam board and the laminated foam board illustrated by FIG. 16 together to form a three layer laminated foam board.
Figure 17:
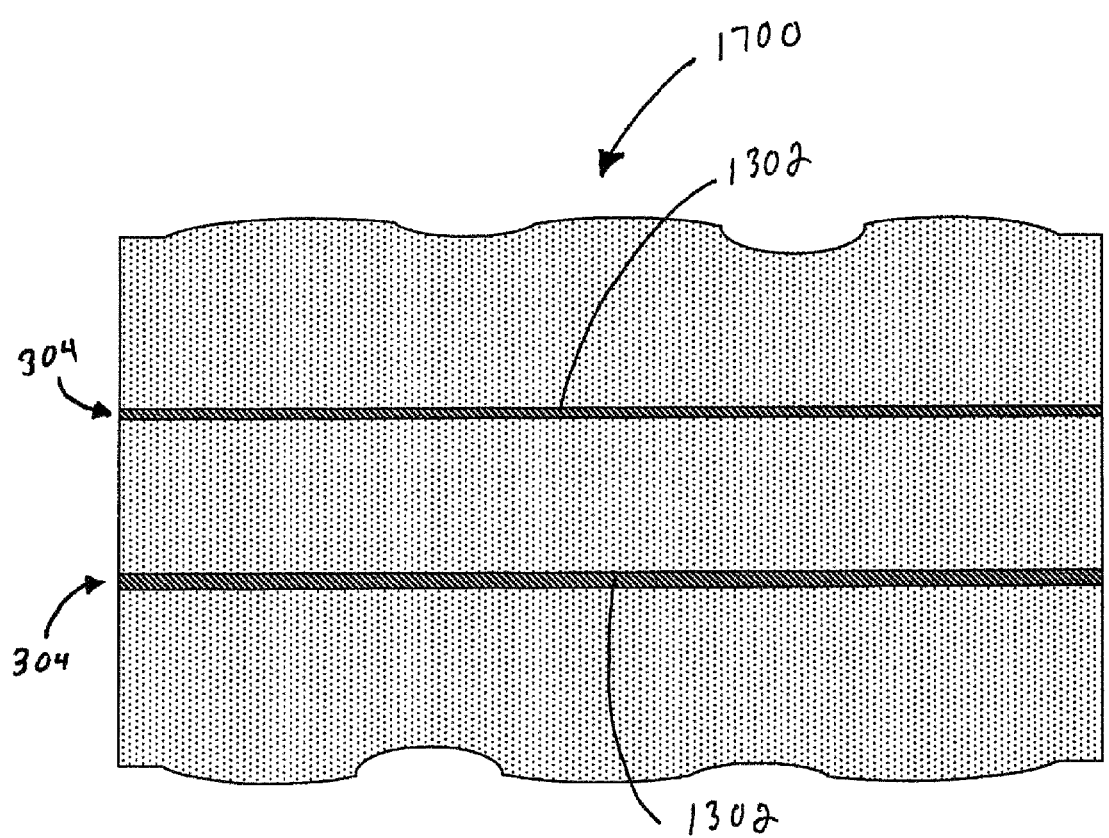
FIG. 17 is a sectional view of an exemplary embodiment of a laminated foam board made by the apparatuses illustrated by FIGS. 15 and 16.

FIGS. 15-17 illustrate that a multi-layer the laminated board 1700 (See FIG. 17) may be formed from three or more boards 110. In one exemplary embodiment, the flattening arrangement 1100 and the clamping device 1210 may be adjustable to accommodate laminating of multiple boards together and to accommodate laminating of boards having different thicknesses. FIGS. 15 and 16 illustrate that use of the flattening arrangement 1100 and the clamping device 1210 to add boards 110 to add layers and form a multiple layer heat laminated foam board 1700. In the example illustrated by FIG. 15, a single board 110 is added. However, in other embodiments, laminated boards 1300 and/or 1700 can be laminated together to add more than one layer at a time.

FIG. 15 illustrates that a foam board 110 is positioned relative to a laminated foam board 1300 such that the major surface surfaces of the boards are substantially aligned. In the example illustrated by FIG. 15 a foam board 110 is positioned below a laminated foam board 1300. However, in other embodiments, the laminated board 1300 can be positioned on the bottom. In the example illustrated by FIG. 15, the upper flattening apparatus 700*a* is adjustable to accept the laminated foam board 1300. In another embodiment, the lower flattening apparatus 700*b* is adjustable to accept a laminated foam board or different sized boards. In one exemplary embodiment, the upper flattening apparatus 700*a* is adjusted by vertically adjusting the position of the upper clamp member 712, while the lower clamp member 714 remains in a fixed position. As such, the vertical position of the surface 1314 being laminated is not changed by the adjustment. In one exemplary embodiment, if the lower flattening apparatus 700*b* is adjustable, it is adjusted by vertically adjusting the position of the lower clamp member 714, while the upper clamp member 714 remains in a fixed position. As such, the vertical position of the surface 1314 being laminated is not changed by the adjustment.

Referring to FIG. 15, a major surface 1314 of the laminated board 1300 and a major surface 112 or 114 of the board 110 is independently flattened. That is, the flattening of the major surface 1314 is separate and independent from the flattening of the major surface 112 of the board 110 being added. In the illustrated exemplary embodiments, the flattening of each of the two board is achieved using heat and pressure. In one exemplary embodiment, the flattened surfaces 814, 1314 of the board 110 and the laminated board 1300 are flattened by a factor at least two, a factor of four, a factor of 10, or even more comparatively flatter than an unprocessed extruded polystyrene board or the unprocessed outer surfaces of the laminated board 1300. In one exemplary embodiment, the flatness variation of the major surface 814 and the major surface 1314 a piece of a board that is 2 feet wide by 2 feet long is less than 0.040 inches, such as less than 0.030 inches, such as less than 0.020 inches, such as less than 0.010 inches, such as less than 0.050 inches. In one exemplary embodiment, the thickness variation range of a piece of aboard 110 and 1300 (each flattened on one side) that is 2 feet wide by 2 feet long is less than 0.078, such as less than 0.062 inches, such as less than 0.031 inches.

In an exemplary embodiment, outer skins 124 (See FIGS. 1 and 2) of the board 110 and the boards of the laminated board 1300 are not removed during the independent flattening. In an exemplary embodiment, a layer of molten material 800 is formed on the flattened surfaces 812, 1314. Referring to FIG. 18, in an exemplary embodiment the heated rollers 714 becomes coated with the molten board material 800. After an initial, start-up or priming of the heated roller 714, the heated roller 714 attains a steady state. That is, the rate at which molten board material 800 is deposited on the roller 714 equals the amount of molten material that leaves the heated roller 714 and is deposited on the flattened surface 814, 1314. As such, the trenches 602 and areas 610 shown in FIGS. 5 and 6 do not form between any of the layers of the multiple layer laminated board 1700.

Referring to FIG. 16, the laminated board 1300 and the board 110 are pressed together 1010 to form the thicker, multi-layer, laminated board. In the example illustrated by FIG. 16, the flattened surfaces 814, 1314 are pressed together. The molten material 800 fills any remaining flatness variations in the board surfaces 814, 1314. When the molten material 880 cools, the material solidifies to uniformly bond the laminated board 1300 to the board 110 together across the flattened surfaces 814, 1314. FIG. 17 illustrates the formed multi-layer laminated board 1700.

The laminated board 1300 may be pressed together with the board 110 in a wide variety of different ways. The clamping device 1210 illustrated by FIG. 12 may be adjusted to accept the increased thickness of the laminated board. In one exemplary embodiment, the upper clamping member 1212 is vertically adjusted to accept the laminated board 1300 and the lower clamping member 1214 is not adjusted. This configuration corresponds to the embodiment where the upper flattening apparatus 700a is adjusted to accommodate the thicker laminated board 1300 and the lower flattening apparatus is not adjusted and flattens single thickness boards. In another embodiment the lower clamping member 1214 is vertically adjusted and the upper clamping member is fixed. This embodiment corresponds to the laminated board being flattened with the lower flattening apparatus. In another embodiment, the position of both the upper clamping member 1214 and the lower clamping member 1214 are adjustable. This embodiment corresponds to an embodiment where both the upper and lower flattening apparatuses 700a, 700b are vertically adjustable to accommodate different thickness boards and/or laminated boards.

Referring to FIG. 16, pressure is applied to the laminated board 1300 and the board 110 by the clamping device 1210. In the illustrated embodiment, the upper clamp member 1212 applies pressure to the laminated board 300 and the lower clamp member 1214 applies pressure to the board 110.

FIG. 17 illustrates the formed multi-layer laminated board 1700. In an exemplary embodiment, the combination of the independent flattening of the surfaces 1314, 814 and the uniform distribution of the molten material 800 by the rollers 714 across the surfaces 1314, 814 results in a very small bond thickness variation. That is, the thickness of the denser material 1314 that forms the bond between the two boards varies by only a small amount. In an exemplary embodiment, in addition to the bond thickness variation of a single board being very small, the bond thickness variation between all of the bonds of a multi-layer laminated board is also very small. That is each of the bonds may be substantially the same thickness and the bond thickness varies only a small amount. In one exemplary embodiment, the bond areas 304 between each of the polystyrene boards is substantially planar and a bond thickness variation between two bonds that laminate three boards together is less than 0.020 inches, or less than 0.015 inches. In one exemplary embodiment, the average bond thickness is between 0.015 and 0.045 inches, such as between 0.020 and 0.040 inches, such as between 0.025 and 0.035, such as about 0.030 inches, with a corresponding bond thickness variation of less than 0.020 inches, or less than 0.015 inches.

In one exemplary embodiment, the bond areas 304 between each of the polystyrene boards have variations as measured in the manner described with respect to FIG. 14A are each less than 0.100 inches, less than 0.075 inches, less than 0.050 inches, or less than 0.020 inches.

Figure 19:
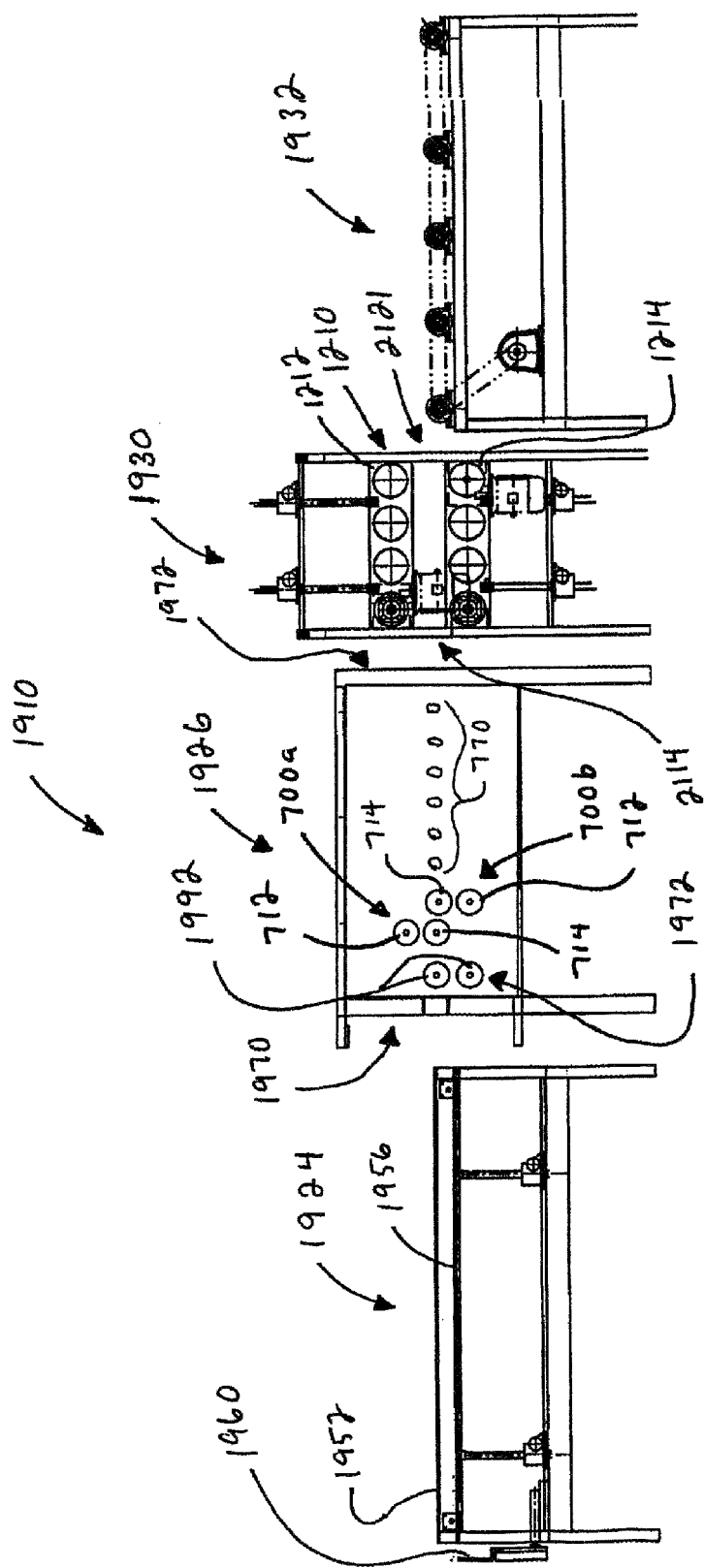
FIG. 19 is a schematic illustration of an exemplary embodiment of an apparatus for making laminated foam boards.
Figure 20:
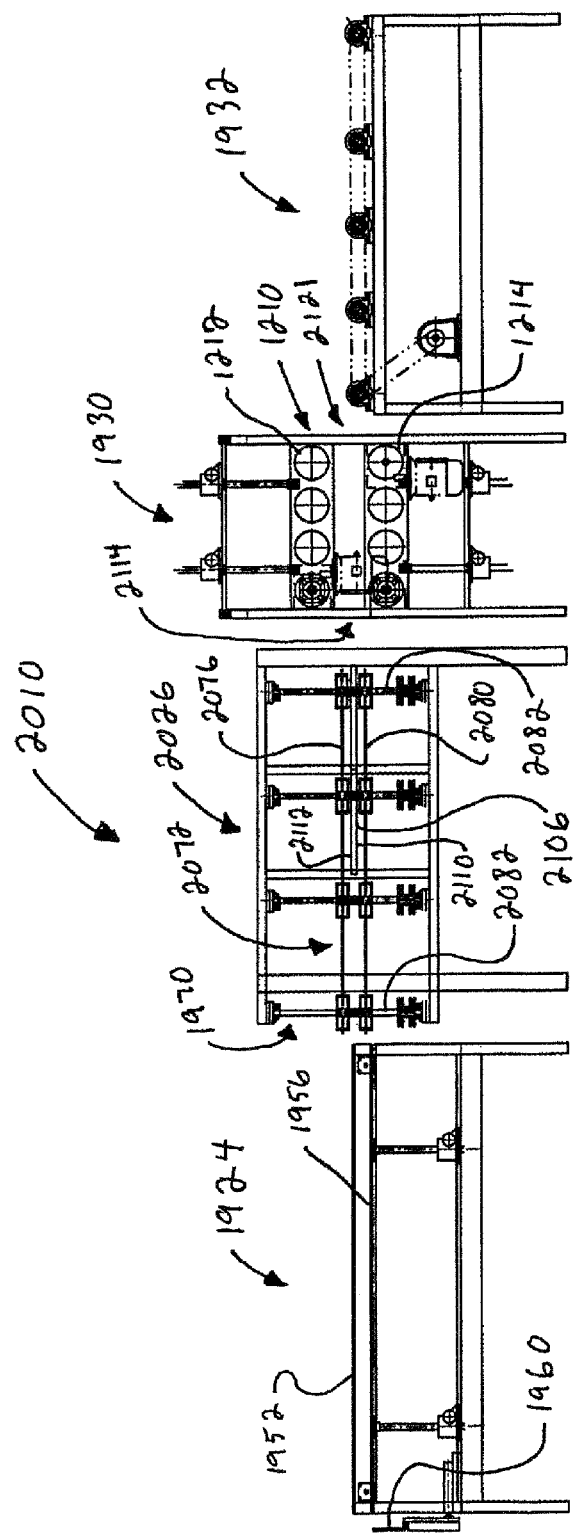
FIG. 20 is a schematic illustration of another exemplary embodiment of an apparatus for making laminated foam boards.
Figure 23:
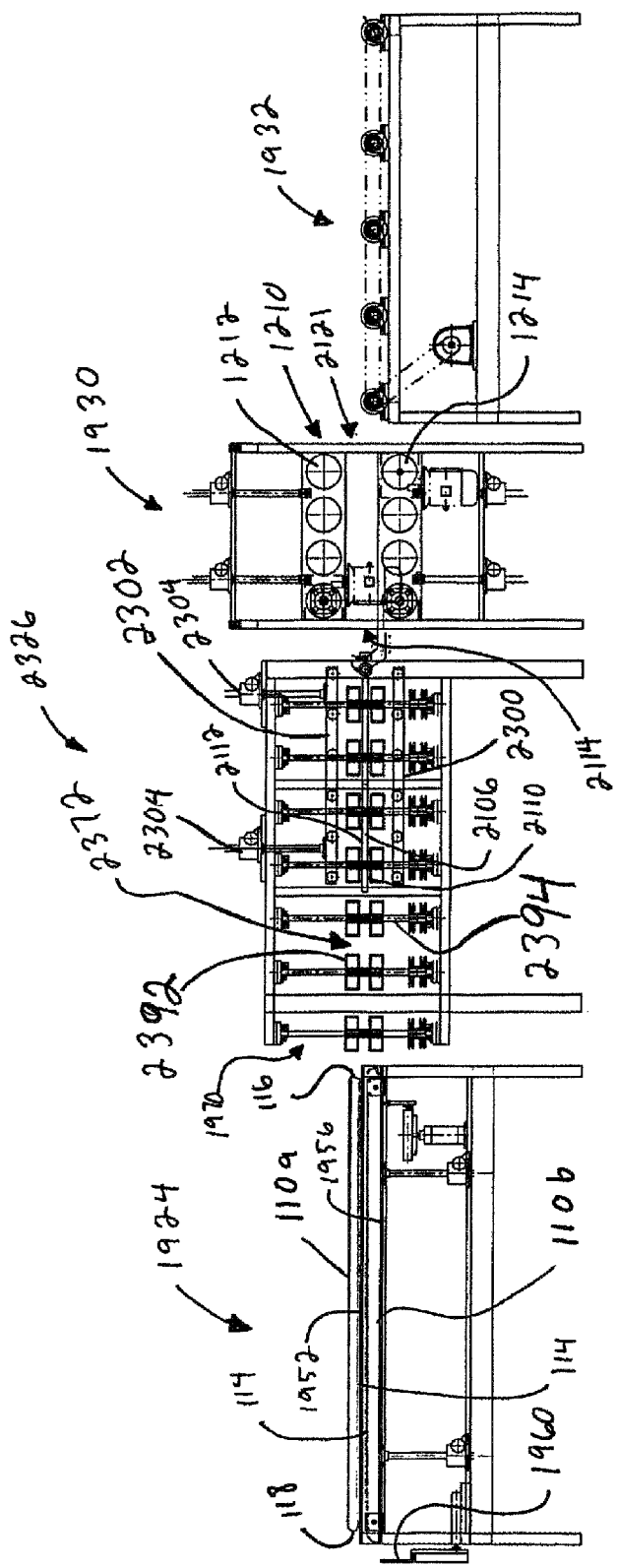
FIG. 23 is a schematic illustration of another exemplary embodiment of an apparatus for making laminated foam boards.

FIGS. 19, 20 and 23 illustrate simplified component diagrams of exemplary systems 1910. 2010, and 23, respectively, for laminating a plurality of foam boards is illustrated in accordance with the method described above. With reference to FIG. 19, for purposes of illustration, the system 1910 is described with reference to laminating two (2) boards 110a, 110b (e.g., foam boards) together to form a laminated foam board 1300 or 1700. In addition, it is contemplated that each of the two foam boards 110a, 110b is between about ½" to about 8" thick so that the laminated foam board 1300 is between about ⅞" to about 16" thick. It is also contemplated, as discussed in more detail below, that each of the two (2) foam boards 110a, 110b may be comprised of multiple layers of foam that have been thermally laminated together, so that the laminated foam board 1300 is between about 1¾" and 32" thick. In one embodiment, each of the two foam boards 110a, 110b is between about 1¹⁵⁄₁₆" and about 1³¹⁄₃₂" thick and the resulting laminated foam board is between about 3¾ "and about 3¹⁵⁄₁₆" thick. The thickness of the laminated board 1300 is less than the total thickness of the original foam boards 110a, 110b due to a bond area or thermo weld portion 304 created at the interface between faces of the original foam boards 110a, 110b. As discussed in more detail below, the bond area or thermal weld portion 304 is relatively denser foam, which is illustrated as a relatively heavier line as opposed to cells in the remainder of the laminated board 1300 or 1700 and the original foam boards 110a, 110b. The relatively denser foam results in a reduced thickness of the laminated foam board 1300 or 1700. In the illustrated embodiment, the bond area or thermal weld portion 304 is contemplated to be between about ¹⁄₆₄" and about ⅛" thick.

The system 1910 illustrated by FIG. 1910 includes a waiting frame 1924 (e.g., a waiting station), a heating and flattening station 1926, a pressing station 1930, and a receiving station 1932. The heating frame and flattening station 1926 and the pressing station 1930 are referred to as a foam board laminator. Each of the waiting frame 1924, the heating and flattening station 1926, the pressing station 1930, and the receiving frame 1932 includes a respective transport system for moving the foam boards 110a, 110b through the frame. As illustrated, the waiting frame 1924, the heating and flattening station 1926, the pressing station 1930, and the receiving frame 1932 are positioned sequentially so that the foam boards 110a, 110a are passed from the waiting frame 1924 to the heating and flattening frame 1926, passed from the heating and flattening frame 1926 to the pressing frame 1930, and then passed from the pressing frame 1930 to the receiving frame 1932.

The waiting frame 1924 is used for preparing and aligning the foam boards 110a, 110b to be laminated together. In an exemplary method illustrated by FIG. 21, in a step 2100, the first foam board 110a is positioned on the waiting frame 1924. In a step 2120, the second foam board 110b is positioned above, and spaced from, the first foam board 110a so that a face 114 of the first foam board 110a is adjacent and opposes (e.g., faces) a face 114 of the second foam board 110b.

Respective leading edges 116 of the first and second foam boards 110a, 110b are aligned, in a step 2140, in the waiting frame 1924. Aligning the leading edges 116 helps ensure an even and smooth leading edge 1950 (See FIG. 18) of the laminated foam board 1300 or 1700.

Referring to FIG. 19, in one embodiment the first foam board 110a is set on an upper rail 1952 of the waiting frame 1924. The upper rail 1952 is movable between a closed position and an open position. The upper rail 1952 is in the closed position when the first foam board 110a is set on the upper rail 1952. An optional sensor (e.g., a photoelectric cell sensor) senses the presence of the first foam board 110a on the upper rail 1952 and transmits a signal to a control circuit (not shown) to switch the upper rail 1952 to the open position. When the upper rail 1952 moves to the open position, the first foam board 110a drops onto a lower rail 1956. After the first foam board 110a is on the lower rail 1956, the sensor senses the absence of the first foam board 110a on the upper rail 1952, and transmits a signal to the control circuit (not shown) to switch the upper rail 1952 back to the closed position. Once the upper rail 1952 is again in the closed position, the second foam board 110b is set on the upper rail 1952. The upper and lower rails 1952,1956, respectively, act as a spacer to create and maintain an initial space between the faces 114 of the first and second foam boards 110*a*, 110*b* (See FIG. 23). In one embodiment, it is contemplated that the initial space between the first faces 114 of the first and second foam boards 110*a*, 110 is determined by a height setting of the lower rail 1956, which is adjustable to suit various board thicknesses. For example, the lower rail 1956 may be lowered to accommodate thicker boards and raised to accommodate thinner boards.

Once the first foam board 110*a* is positioned on the lower rail 1956 and the second foam board 110*b* is positioned on the upper rail 1952, a pusher plate 1960 (e.g., a pusher) is activated. Referring to FIG. 23, the pusher plate 1960 aligns the foam boards 110*a*, 110*b* by pushing trailing edges 118 of the foam boards 110*a*, 110*b* so that the leading edges 116 of the foam boards 110*a*, 110*b* contact an optional stop. The pusher plate 1960 pushes the foam boards 110*a*, 110*b* toward an entrance 1970 of the heating and flattening frame 1926.

Referring to FIG. 19, an exemplary space of 250 mm is between the waiting frame 1924 and the heating frame 1926. An exemplary space of 150 mm is between the heating and flattening frame 1926 and the receiving frame 1932. Although specific spaces of 250 mm and 150 mm are illustrated between the waiting frame 1924 and the heating frame 1926 and between the heating frame 1926 and the receiving frame 1932, respectively, it is to be understood that the spaces between the waiting frame 1924 and the heating frame 1926 and between the heating frame 1926 and the receiving frame 1932 are adjustable. For example, the space between the heating frame 1926 and the receiving frame 1932 may be increased for thicker foam boards.

In a step 2160, the foam boards 110*a*, 110*b* are received at the entrance 1970 of the heating and flattening frame 1926. As the foam boards 110*a*, 110*b* are pushed into the heating frame 1926 by the pusher plate 1960, the foam boards 110*a*, 110*b* engage a means for passing 1972 the foam boards 110*a*, 110*b* from the entrance 1970 of the heating and flattening frame 1926 to an exit 1974 of the heating and flattening frame 1926.

In the exemplary embodiment Illustrated by FIG. 19, the means for passing 1972 comprises the rollers of the flattening apparatuses 700*a*, 700*b* illustrated by FIG. 18. In the example illustrated by FIG. 19, each of the upper and lower flattening apparatuses 700*a*, 700*b*, comprise a heated roller 714 and a roller 712 that is not heated. In addition to the rollers 714, 712, the means for passing 1972 may includes additional drive rollers 1992. All of the rollers 714, 712, 1992 may be driven by horizontal shafts. The rollers 714, 712 clamp against the boards 110*a*, 110*b* to flatten the bottom major surface 112 or 114 of the board 110*a* and the top major surface 112 or 114 of the board 110*b*. In the illustrated exemplary embodiments, the flattening of each of the two boards is achieved using heat and pressure applied by the rollers 714, 712. In the exemplary embodiment illustrated by FIG. 19, the heating and flattening frame 1926 also includes the optional downstream heating elements 770.

In an exemplary embodiment, a layer of molten material 800 is formed on the flattened surfaces 812, 814. Referring to FIG. 19, in an exemplary embodiment the heated roller 814 becomes coated with the molten board material 800. After an initial, start-up or priming of the heated roller 814, the heated roller 814 attains a steady state. That is, the rate at which molten board material 800 is deposited on the roller 714 equals the amount of molten material that leaves the heated roller 714 and is deposited on the flattened surface 812, 814. As such, the trenches 602 and areas 610 shown in FIGS. 5 and 6 do not form. In an exemplary embodiment, the optional downstream heating elements 770 keep the layer of molten board material in a melted state as the boards are fed into the pressing frame 1930.

FIG. 20 illustrates another exemplary embodiment of a system 2010 for laminating a plurality of foam boards. The system 2010 illustrated by FIG. 20 is substantially similar to the system 1910 illustrated by FIG. 19, except the heating and flattening frame 1926 is replaced with another embodiment of a heating frame 2026. In the example illustrated by FIG. 20, a means for passing 2072 the foam boards 110*a*. 110*b* through the heating frame 2026 includes at least one pair of chains 2076, 2080 driven by respective vertical shafts 2082, which in turn are driven by a motor (not shown) turning respective sprockets on the vertical shafts 2082. In the illustrated embodiment, the at least one chain 2076, 2080 is driven by the sprockets on rollers mounted on the vertical shafts 2082. However, other methods for driving the at least one chain 2076, 2080 are also contemplated.

Figure 22:
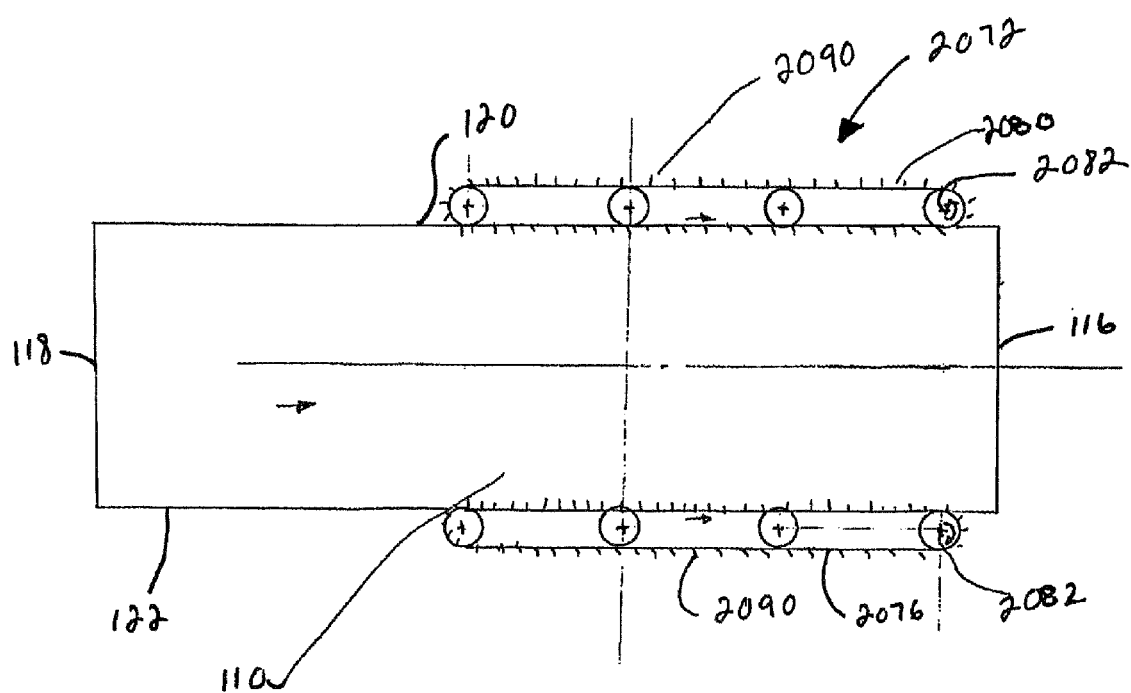
FIG. 22 illustrates a top view of an exemplary embodiment of an alternate means for passing foam boards through a heating frame in accordance with one embodiment illustrating principles of the present invention.

With reference to FIG. 22, a top view of the pair of the chains 2080 illustrates that the chains 2080 include spikes 2090 that engage (e.g., impale) the foam board 110*b* as the foam board 110*b* passes through the heating frame 1926 (see FIG. 20). The engagement of the spikes 2090 with the foam board 110*b* moves the foam board 110*b* through the heating frame 2026 (see FIG. 20) as the pair of chains 2080 is driven by the vertical shafts 2082. The engagement of the spikes 2090 with the foam board 110*b* also facilitates keeping the foam board 110*b* positioned relatively flat, level, and relatively parallel with respect to the other foam board 110*a* (see FIG. 20). The engagement of the spikes 1990 with the foam board 110*b* facilitates keeping the foam board 110*b* suspended above the heating element 2106 so the foam board 110*b* does not touch the heating element 2106. Spikes (not shown) on the chains 2076 act to engage (e.g., impale) the foam board 110*a*, in a manner similar to the way the spikes 2090 engage the foam board 110*b*, to move the foam board 110*a* through the heating frame 1926 (see FIG. 20) as the pair of chains 2076 is driven by the vertical shafts 2082. The engagement of the spikes (not shown) with the foam board 110*a* also facilitates keeping the foam board 110*a* positioned relatively flat, level, and relatively parallel with respect to the other foam board 110*b* (see FIG. 20) and suspended below the heating element 2106 so the foam board 110*a* does not touch the heating element 2106.

FIG. 23 illustrates another exemplary embodiment of a system 2310 for laminating a plurality of foam boards. The system 2310 illustrated by FIG. 23 is substantially similar to the system 2010 illustrated by FIG. 20, except the heating frame 2026 is replaced with another embodiment of a heating frame 2326. With reference to FIG. 23, in this embodiment a means for passing 2372 the foam boards 110*a*, 110*b* through the heating frame 2326 includes a mechanism having rollers 2392 driven by respective vertical shafts 2394, which in turn are driven by a motor (not shown) turning respective sprockets on the vertical shafts 2394. The rollers 2392 frictionally engage the foam boards 110*a*, 110*b*. First and second roller conveyers 2300, 2302 facilitate maintaining the first and second foam boards 110*a*, 110*b* respectively, positioned relatively flat, level, and relatively parallel with respect to each other. Angle gear boxes 2304 permit angular adjustment of the first roller conveyer 2300 to ensure the first roller conveyer 2300 is substantially parallel to the first foam board 110*a*. Angle gear boxes, although not illustrated, are also contemplated for similarly permitting angular adjustment of the second roller conveyer 2302 to ensure the second roller conveyer 2302 is substantially parallel to the second foam board 110*b*. Other embodiments, in which the mechanism is a tapered plate or a Teflon coated conveyor belt system are also contemplated.

In the exemplary embodiment illustrated by FIG. 19, the first and second foam boards are heated and flattened as described with respect to FIGS. 7, 11, and 18 above. In the exemplary embodiments illustrated by FIGS. 20 and 23, the first and second foam boards 110a, 110b are positioned so that the face 114 of the first board 110a and the face 114 of the second board 110b pass by a heating element 2106 (e.g., a heating plate) as the first and second foam boards 110a, 110b pass through the heating frame 2026 or 2326. It is contemplated that the heating element 2106 is about the same width as the first and second foam boards 110a, 110b. In addition, it is contemplated that the heating element 2106 is between about 5 mm and about 50 mm thick and, in one embodiment, is between about 20 mm and about 30 mm thick. With reference to the waiting frame 1924, it is contemplated that the initial space between the first faces 114 of the first foam board 110a (while on the lower rail 1956) and second foam board 110b (while on the upper rail 1952) is greater than the thickness of the heating element 2106 (See FIG. 23).

The heating element 2106 (or the heated rollers 714 in the FIG. 19 embodiment) is heated to a predetermined temperature (e.g., a softening point of the polymer foam). In one embodiment, the predetermined temperature is about 240° F., but may be adjusted based on board properties, the distance(s) between the heating element 2106 and the faces 114 of the first and second boards 110a, 110b, the speed at which the first and second boards 110a, 110b pass by the heating element 2106, etc. In step 2200 of the method illustrated by FIG. 21, the faces 114 of the first and second boards 110a, 110b are heated. More specifically, the faces 114 of the first and second boards 110a, 110b are simultaneously passed by the heating element 2106 (or against the heated rollers 714 in the FIG. 19 embodiment). For example, the face 114 of the first board 110a passes by a first face 2110 (e.g., bottom face) of the heating element 2106 and the face 114 of the second board 110b passes by the a second face 2112 of the heating element 2106. It is contemplated that the predetermined temperature of the heating element 2106, the distances between the heating element 2106 and the faces 114 of the first and second boards 110a, 110b and the length of time the faces 114 of the first and second boards 110a, 110b are exposed to the heat of the heating element 2106 are set to appropriately heat the first and second boards 110a, 110b for lamination to each other. It is understood that the length of time the faces 114 of the first and second boards 110a, 110b are exposed to the heat of the heating element 2106 (or the heated rollers 714 in the FIG. 19 embodiment) is determined by the speed at which the means for passing 1972 the foam boards 110a, 110b through the heating frame 1926 travels.

As discussed above, the initial space between the first and second foam boards 110a, 110b is determined by a height setting of the lower rail 1956, which is adjustable to suit various board thicknesses. For example, the lower rail 1956 may be lowered to accommodate thicker boards and raised to accommodate thinner boards. It is contemplated that the heating element 2106 and the upper rail 1952 are also adjustable to different positions (elevations). Therefore, during operation, an operator may adjust the position(s) of the lower rail 2156 and/or the heating element 2106 to accommodate the board thickness while maintaining a gap between the heating element 2106 and the first face 2136 of the first board 110a. The operator may also adjust the position(s) of the upper rail 1952 and/or the heating element 2106 to accommodate the board thickness while maintaining a gap between the heating element 2106 and the face 114 of the second board 110b (e.g., an initial gap of between about 1/32" and 2"). In one embodiment the gap between the heating element 2106 and the face 114 of the first board 110a is adjusted to be about the same size as a gap between the heating element 2106 and the face 114 of the second board 110b (e.g., an initial gap of between about 1/32" and 2"). However, other embodiments, in which the gap between the heating element 2106 and the face 114 of the first board 110a is adjusted to be a different size gap than between the heating element 2106 and the face 114 of the second board 110b, are also contemplated. It is also contemplated that not all of the upper rail 1952, the lower rail 1956, and the heating element 2106 are adjustable to different positions For example, if only the lower rail 2156 is adjustable, the gap between the heating element 2106 and the face 114 of the second board 110b is not adjustable by moving the upper rail 1952 and/or the heating element 2106 and, instead, is set by the thickness of the second board 110b.

Figure 21:
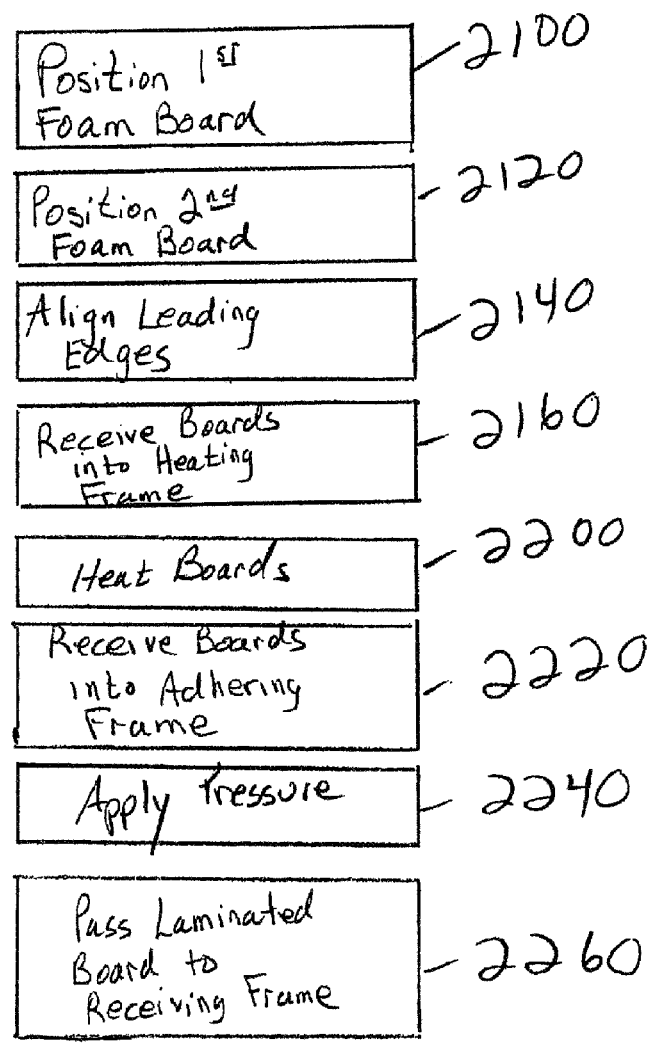
FIG. 21 is an exemplary methodology for laminating foam boards in accordance with one embodiment illustrating principles of the present invention.

In each of the embodiments illustrated by FIGS. 19, 20, and 23, the foam boards 110a, 110b exit the heating frame 1926, 2026, or 2326 and are received at an entrance 2114 of the pressing frame 1930 (See step 2220 of the method illustrated by FIG. 21). Rollers 1212, 1214 in the pressing frame 1930 frictionally engage and move the first and second foam boards 110a, 110b from the entrance 2114 of the pressing frame 1930, through the pressing frame 1930, and to an exit 2121 of the pressing frame 1930. In one embodiment, it is contemplated that a height of the pressing frame entrance 2114 is greater than a height of the pressing frame exit 2121. Therefore, the opening of the pressing frame 1930, which is defined by the rollers 1212, 1214, tapers from the pressing frame entrance 2114 to the pressing frame exit 2120. For example, in one embodiment, the height of the pressing frame entrance 2114 is about 6", and the height of the pressing frame exit 2121 is about 4". As the foam boards 110a, 110b pass through the pressing frame 1926 toward the exit 2121, the rollers apply pressure to the faces 114 of the first and second foam boards 110a, 110b (See step 2240 of the method illustrated by FIG. 21). Since the opening of the pressing frame 1930 tapers down to the relatively smaller height of the exit 2121, the rollers 1212, 1214 apply progressively higher pressure to the first and second foam boards 110a, 110b as the foam boards 110a, 110b move toward the exit 2121. Therefore, the faces 114 are pushed into contact. Since the faces 114 of the first and second foam boards 110a, 110b are still warm and include the melted material 800, the faces 114 meld together. In other words, the faces 114 form a densified melt and are welded together to form the bond area or thermal weld 304. Therefore, the first and second foam boards 110a, 110b are laminated together to form the laminated board 1300 or 1700. The heights of the adhering frame entrance 2114 and the adhering frame exit 2120 may be adjustable.

Figures 23A, 23B:
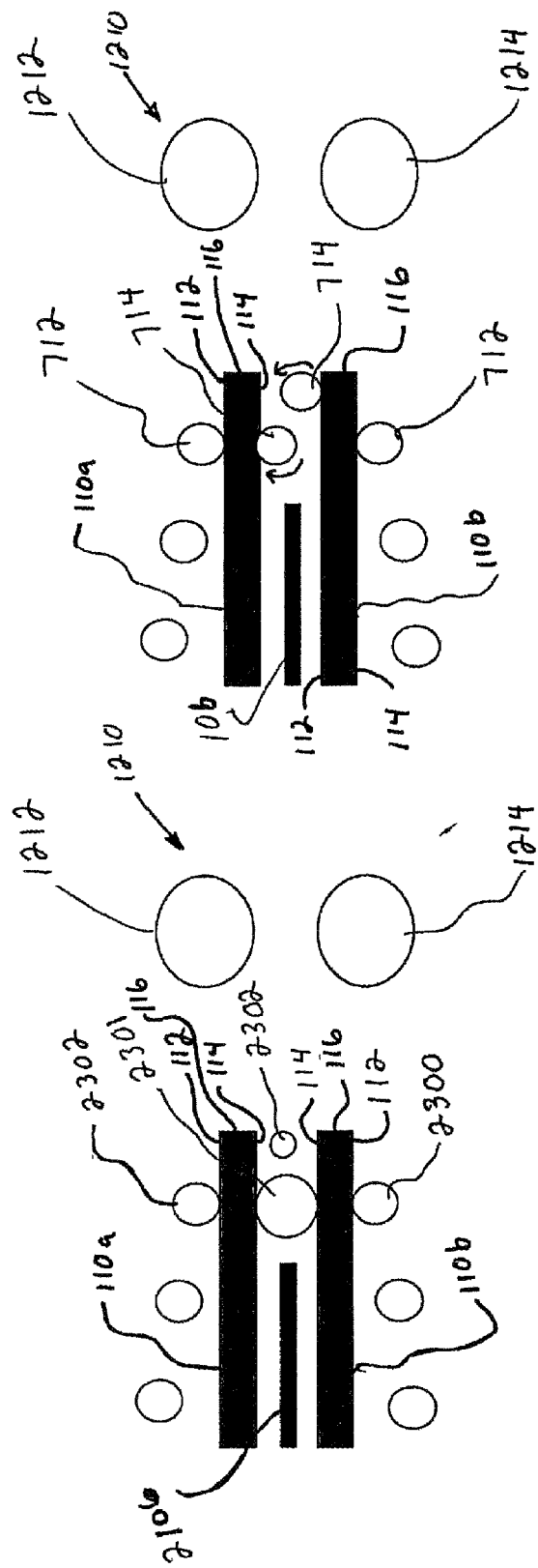
FIG. 23A is a schematic illustration of foam boards passing by heating rods in accordance with one embodiment of an apparatus illustrating principles of the present invention.
FIG. 23B is a schematic representation of foam boards passing by heating rods in accordance with another embodiment of an apparatus illustrating principles of the present invention.

FIG. 23A illustrates a variation of the heating frames illustrated by FIGS. 20 and 23. In the example illustrated by FIG. 23A, after the first and second foam boards 110a, 110b pass over the heating element 2106, the face 114 of the first board 110a and the face 114 of the second board 110b pass over a first heated rod 2301 which extends the width of the foam boards 110a, 110b. The position of the last roll in the second roller conveyer 2302 forces the face 114 of the first board 110a to come in contact with the first heated rod 2301. The position of the last roll in the first roller conveyer 2300 forces the face 114 of the second board 110b to also come in contact with the heated rod 2301. The temperature of the heated rod 2301 combined with the line speed induce additional molten polystyrene to form on the faces 114 of the foam boards 110a, 110b. As the first and second foam boards 110a, 110b continue to move, they then pass over a second heating rod 2302 which in one embodiment is of a smaller diameter than the first heating rod 2301. The relatively smaller diameter of the second heating rod 2302 compared with the first heating rod 2301 allows the foam boards 110a, 110b to bend adequately to enter the pressing frame 1930. The temperature of the second heating rod 2302 along with the line speed induces the molten polystyrene on the face 114 of the first board 110a and the face 114 of the second board 110b to remain molten in preparation for bonding in the pressing frame 1930.

FIG. 23B illustrates a variation of the heating and flattening frames illustrated by FIGS. 19, 20, and 23. In the example illustrated by FIG. 23B, two pairs of heating and compressing rollers 712, 714 are included. The heating and compressing rollers 712, 714 may be as described with respect to FIG. 18. The first and second heated rollers or rods 714 are substantially the same diameter, but are offset in the horizontal and vertical planes. Both of the heating rods 714 are free to rotate or are driven to rotate while melting the foam surface. This provides a mechanism to prevent the build up of too much molten polystyrene on the rods 714 and prevents the molten polystyrene from dripping off the rods and forming the trenches or "worm holes" described above. The rotating heating rods 714 apply a uniform coating of molten polystyrene across the entire foam surface.

Although the embodiments discussed above contemplate both the heating element 2106 and the first and second heated rods 714, other embodiments including only the heated rods 714 (either of different or substantially the same diameters, as discussed in the above embodiments) or only the heating element 2106 are also contemplated.

In another embodiment, it is contemplated that the height of the adhering frame entrance 2114 is the same as the height of the adhering frame exit 2120, and the rollers 1212, 1214 are substantially at the same distance from each other (e.g., parallel). In this embodiment, the rollers 1212, 1214 apply pressure and compress the foam boards 110a, 110b together (as discussed above) as the foam boards 110a, 110b pass through the pressing frame 1926. The heights of the adhering frame entrance 2114 and the adhering frame exit 2120 may be adjustable.

Whether the rollers 1212, 1214 in the adhering frame 1930 are set up in a tapered or parallel arrangement may be determined as a function of the thickness of the foam boards 110a, 110b and a thickness of the heater 2106.

Referring to FIGS. 19, 20, and 23, the laminated board 1300 or 1700 is passed from the exit 2120 of the adhering frame 1930 to the receiving frame 1932. Since being aligned at the waiting frame 1924, the leading edges 116 of the foam boards 110a, 110b remain aligned after the foam boards 110a, 110b are laminated into the laminated board 1300 or 1700.

A number of extruded polystyrene foam boards were made on an experimental basis to illustrate the thermolamination effectiveness of the embodiments of the present invention. Four of the samples were set forth for the laminating bond strength by tensile strength test according to ASTM D1623 as follows:

| Sample ID | Adhesive Tensile Strength Kpa (psi) | Failure Location |
|---|---|---|
| 1 | 425 (61.52) | Sample/test plate weld |
| 2 | 527 (76.62) | Sample/test plate weld |
| 3 | 506 (73.32) | Sample/test plate weld |
| 4 | 402 (58.36) | Sample/test plate weld |
| Average | 465 (67.5) | |
| SD | 60.8 (8.9) | |

Both polystyrene foam boards to be laminated were in the thickness around 35 MM (1.4") each with a density around 27.8 Kg/m$^3$ (1.73 pcf), and tensile strength around 448 Kpa (65 psi).

The laminating bond strength, which is evaluated by tensile strength tests demonstrate that the adhesive strength between the laminating layer at least as strong as the original foam strength.

In one embodiment, it is contemplated that the speeds at which the foam boards 110a, 110b move through the waiting frame 1924, the heating and flattening frame 1926, and the adhering frame 1930 are consistent. For example, the foam boards 110a, 110b move through the heating and flattening frame 1926 at a first speed and move through the adhering frame 1930 at a second speed. In one embodiment, the first speed is about the same as (e.g., consistent with) the second speed.

Although each of the foam boards 110a, 110b discussed above has been described as respective single boards between about ½" to about 8" thick, it is to be understood that one or both of the foam boards is also contemplated to be previously laminated. If both of the foam boards were previously laminated one time, the thickness of the respective previously laminated foam boards may be between about ⅞" to about 16" thick. The resulting laminated board will then be between about 1⅝" to about 32" thick. Therefore, it is to be understood that the systems 1910, 2010, 2310 and methodology for laminating foam boards described above may be used repeatedly for previously laminated foam boards, with the resulting laminated boards becoming thicker and thicker with each pass through the system 1910, 2010, 2310.

Although the systems 1910, 2010, 2310 have been described with reference to laminating two (2) foam boards 110a, 110b together, it is to be understood that simple modifications to the systems 1910, 2010, 2310, such as the adjustability described with reference to FIGS. 15, 16, and 18, would accommodate laminating any number of foam boards together. For example, additional heating elements would be incorporated into the heating and flattening frame 1926 so additional foam boards may be simultaneously laminated. In addition, it is contemplated that the systems 1910, 2010, 2310 may accommodate different thicknesses for the respective boards and that the systems 1910, 2010, 2310 may be designed to accommodate foam boards of various densities and thicknesses.

The foam boards may include different surface preparations. In one embodiment, at least one of the foam boards includes a relatively smooth surface, which is derived from a process of manufacturing the foam board. In another embodiment, at least one of the foam boards includes a planned surface, which is created using an auxiliary cutting process during which the entire surface of the foam board is machined flat. In that embodiment, the faces 114 of the first and second foam boards 110a, 110b are planed, which exposes cells in the foam board. The planing technique makes a much flatter surface facilitating a more uniform surface adhesion, which is useful in the embodiments disclosed by FIGS. 20 and 23. It is also possible to that both of the faces of the foam boards are planned. Foam boards having both faces planned are contemplated for embodiments including three (3) or more foam boards adhered together to form a relatively thicker final foam board.

It is contemplated that the systems 1910, 2010, 2310 described above may be used either off-line, which is a manual operation, or on-line, which is a more automated process. For example, off-line operation involves an operator manually placing the first and second foam boards 110a, 110b on the waiting frame 1924, as discussed above (from, for example, a transporting facility). On-line operation involves, for example, a machine cutting a continuous strip of foam sheet into the desired lengths to form the foam boards, which are then deposited on the waiting frame 1924, as discussed above (from, for example, an extruding line).

When the boards are laminated using any of the thermo-processes and/or apparatuses described above, no additional chemicals (e.g., glue) are required for the lamination. Without any additional chemicals such as glue, the boards thermo-laminated by the process described above may be more easily recycled. More specifically, recycled boards from the process described above would not include any contaminants (e.g., glue) and, therefore, result in a "cleaner" recycled product. In addition, boards laminated using additional chemicals (e.g., glue) are more difficult to cut using a hot wire, since a hot wire does not melt through hardened glue as easily as the foam boards. Consequently, foam boards laminated using chemicals such as glue may need to be cut using a cutter such as a router.

Figure 24:
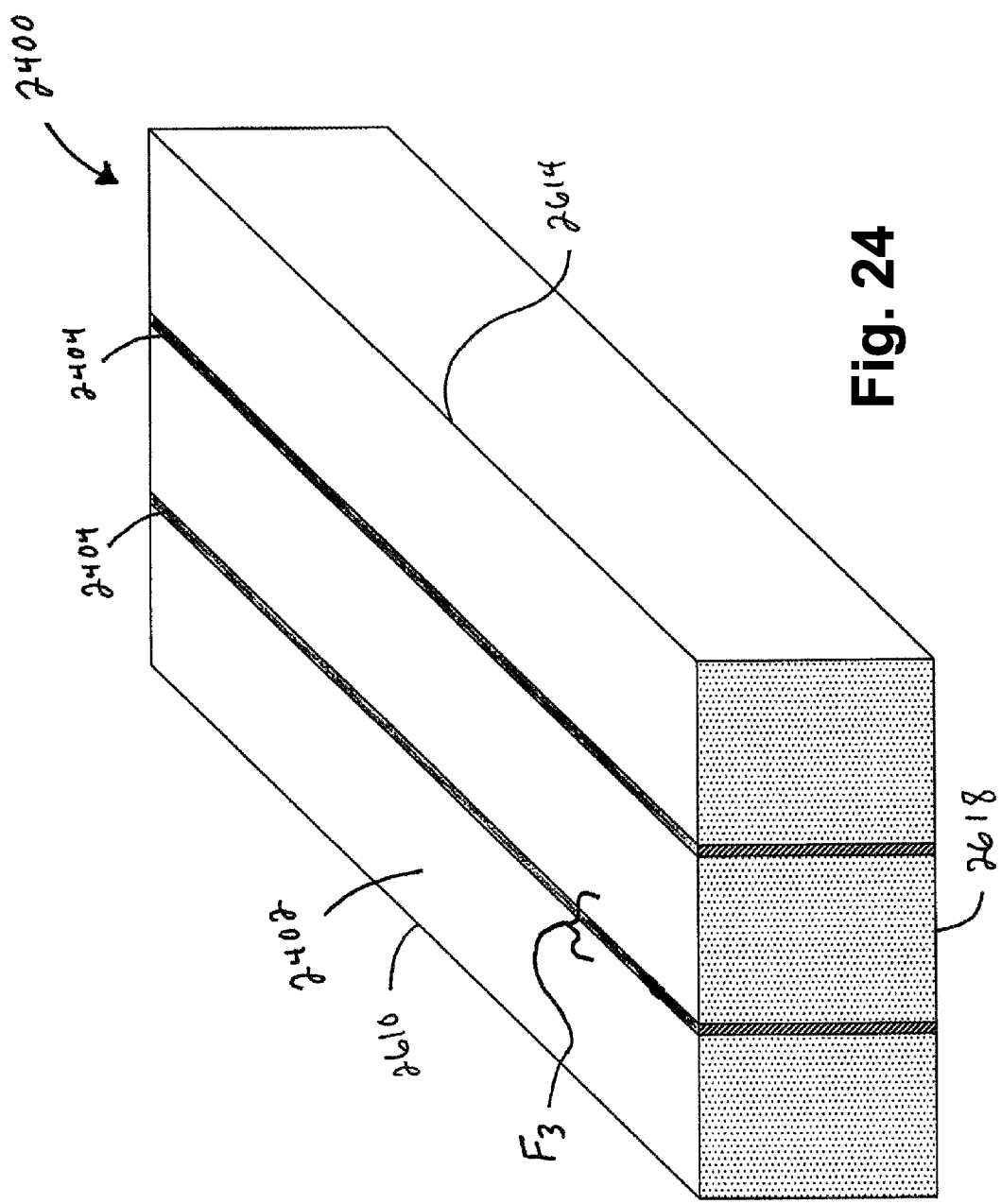
FIG. 24 illustrates an exemplary embodiment of a billet made from a laminated board made in accordance with an exemplary embodiment of the present invention.

FIG. 24 illustrates an exemplary embodiment of a smaller foam piece 2400. The smaller foam piece 2400 is made by cutting a laminated foam board 1300 or 1700. The laminated foam board 1300 or 1700 may be cut in a wide variety of different ways to make the smaller foam piece 2400. For example, a laminated foam board 1300 or 1700 may be cut with a hot wire or a saw blade, such as a band saw blade, a reciprocating saw blade, an abrasive wire or a circular saw blade to form a plurality of smaller foam pieces. The smaller foam pieces 2400 are made in an appropriate size for making a foam part.

In one exemplary embodiment, a cut surface 2402 of the smaller foam piece 2400 is very smooth across the bond lines 2404. The thermal bonding processes and apparatus described above make this very smooth cut surface 2402 across the bond lines 2404 possible. The laminated foam boards 1300, 1700 are free of the cavities or voids 302 (See FIG. 3), channels 602 (See FIG. 6), and unexpected areas of harder/denser material 600 (See FIG. 6). The presence of only a consistently located uniform bond line, without these defects, allows the very smooth cut surface 2402 to be formed. The very smooth cut surface 2402 allows high quality foam parts, without surface imperfections to be made from the billets 2400. In one exemplary embodiment, the flatness variation F3 of the smaller foam piece 2400 across a bond line is less than or equal to 0.005 inches, such as less than 0.004 inches, such as less than 0.003 inches.

Figure 25B:
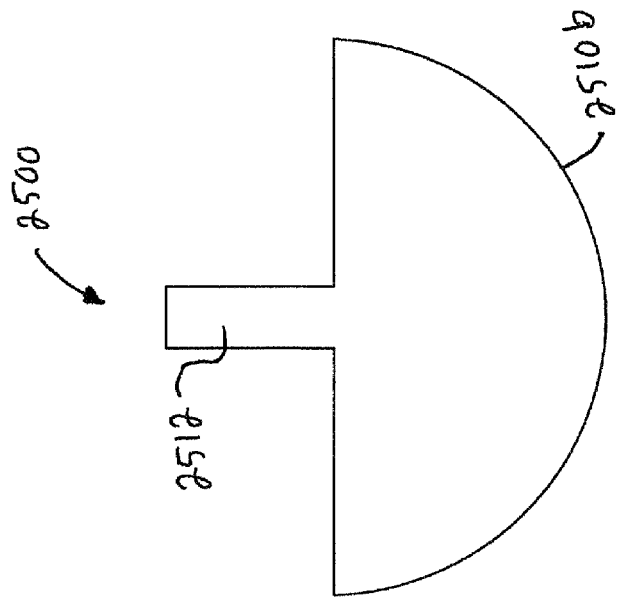
FIG. 25B illustrates an exemplary embodiment of a tool for making foam products out of foam.
Figure 25A:
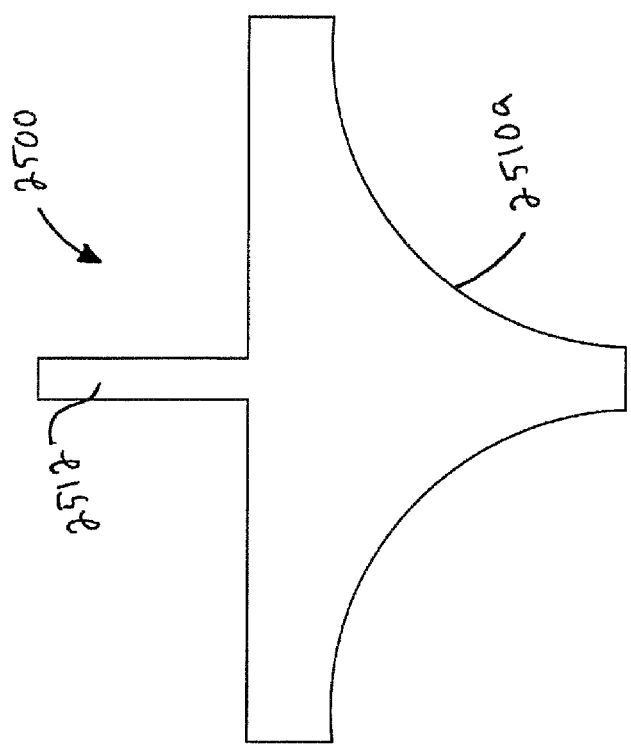
FIG. 25A illustrates an exemplary embodiment of a tool for making foam products out of foam.
Figure 30:
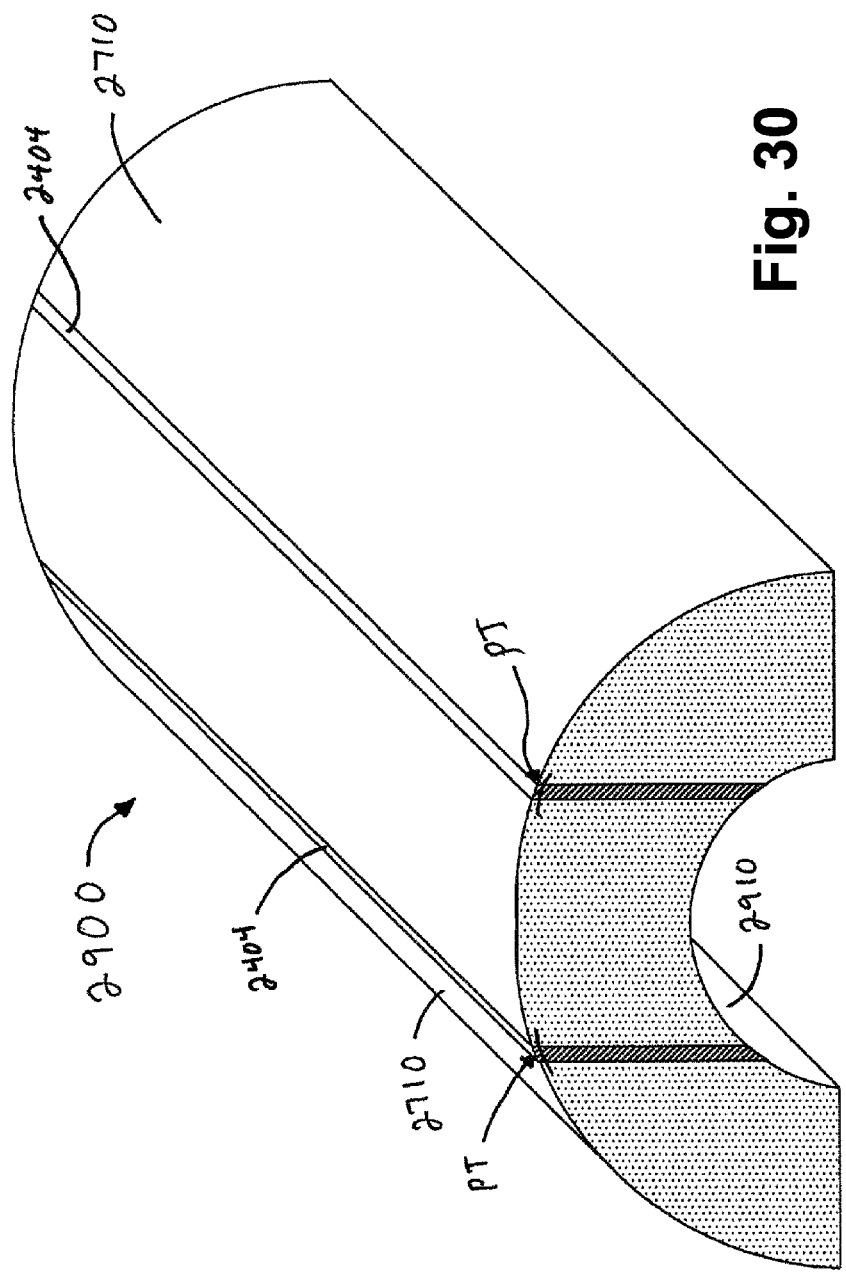
FIG. 30 is a perspective view of an exemplary embodiment of a foam product formed from a laminated foam piece.

The laminated foam board 1300, 1700 or the smaller foam piece 2400 can be cut into foam parts 2900 (See FIG. 29) in a wide variety of different ways. In one exemplary embodiment, the smaller foam piece 2400 is cut into a foam part 2900 with a rotary cutting tool 2500 (See FIGS. 25A and 25B). The rotary cutting tool 2500 can take a wide variety of different forms. In one exemplary embodiment, the rotary cutting tool 2500 is a router-type tool with a head 2510 shaped to cut an appropriate shape into the smaller foam piece 2400 and a shaft 2512 for rotating the head. FIGS. 25A and 25B illustrate two examples of rotary cutting tools 2500 for machining the billets 2400 into foam parts 2900. The cutting head 2510a illustrated by FIG. 25A cuts an external curved surface 2710 (See FIG. 27). The cutting head 2510b cuts an internal curved surface 2910 (See FIG. 29). FIGS. 26-29 illustrate the cutting heads 2510a, 2510b machining the billet 2400 to form a part 2900. In the example illustrated by FIGS. 26-30, the foam part 2900 is one-half of a cylindrical pipe insulation cover (the second half being a copy of the first). However, the smaller foam piece 2400 and cutting tools 2500 can be configured and used to make a wide variety of different types of foam parts, such as elbows, T-shaped pipe covers, etc. Referring to FIGS. 26 and 27, the cutting head 2510a removes foam material along an edge 2610 to provide the part with a first curved outer surface 2612, such as a radiused surface. In the example, the cutting head 2510 removes foam material and a portion of the material of the bond line 2404. Referring to FIGS. 26 and 28, the cutting head 2510a removes foam material along an edge 2614 to provide the part with a second curved outer surface 2710, such as a radiused surface. In the example, the cutting head 2510 removes foam material and a portion of the material of the bond line 2404. Referring to FIGS. 26 and 29, the cutting head 2510b removes foam material along a bottom surface 2618 to provide the part with a curved inner surface 2622, such as a cylindrical inner surface. In the example, the cutting head 2510b removes foam material and a portion of the material of the bond lines 2404. FIG. 30 illustrates the finished foam part 2900.

In one exemplary embodiment, a machined surface 2710, 2910 of the foam part 2900 is very smooth and uniform across the bond lines 2404. The thermal bonding processes and apparatus described above make this very smooth and uniform machined surface 2710, 2910 across the bond lines 2404 possible. The laminated foam boards 1300, 1700 are free of the cavities or voids 302 (See FIG. 3), channels 602 (See FIG. 6), and unexpected areas of harder/denser material 600 (See FIG. 6). The presence of only a consistently located uniform bond line, without these defects, allows the very smooth and uniform machined surface 2710, 2910 to be formed. The very smooth cut surface 2710, 2910 results in high quality foam parts 2900, without surface imperfections at the bond line(s) to be made. In one exemplary embodiment, the profile tolerance PT of the foam part 2700 across a bond line 2404 is less than or equal to 0.015 inches, such as less than 0.010 inches, such as less than 0.005 inches. The profile tolerance PT is the difference between the intended or designed shape and the actual shape of the part in the area of the bond line, such as the bond line and ¼ inch on each side of the bond line. For example, the intended shape of the outer surface of the part 2900 illustrated by FIG. 30 may be a four inch diameter cylinder. The profile tolerance PT in the area of the bond line may be 0.010 inches. If a cavity or void 302 (See FIG. 3) or a channel 602 (See FIG. 6) with a remaining portion (i.e. the portion that remains after machining) that is deeper than 0.010 inches were in the machined bond line 2404, the part 2900 would be outside of the profile tolerance.

Figure 31:
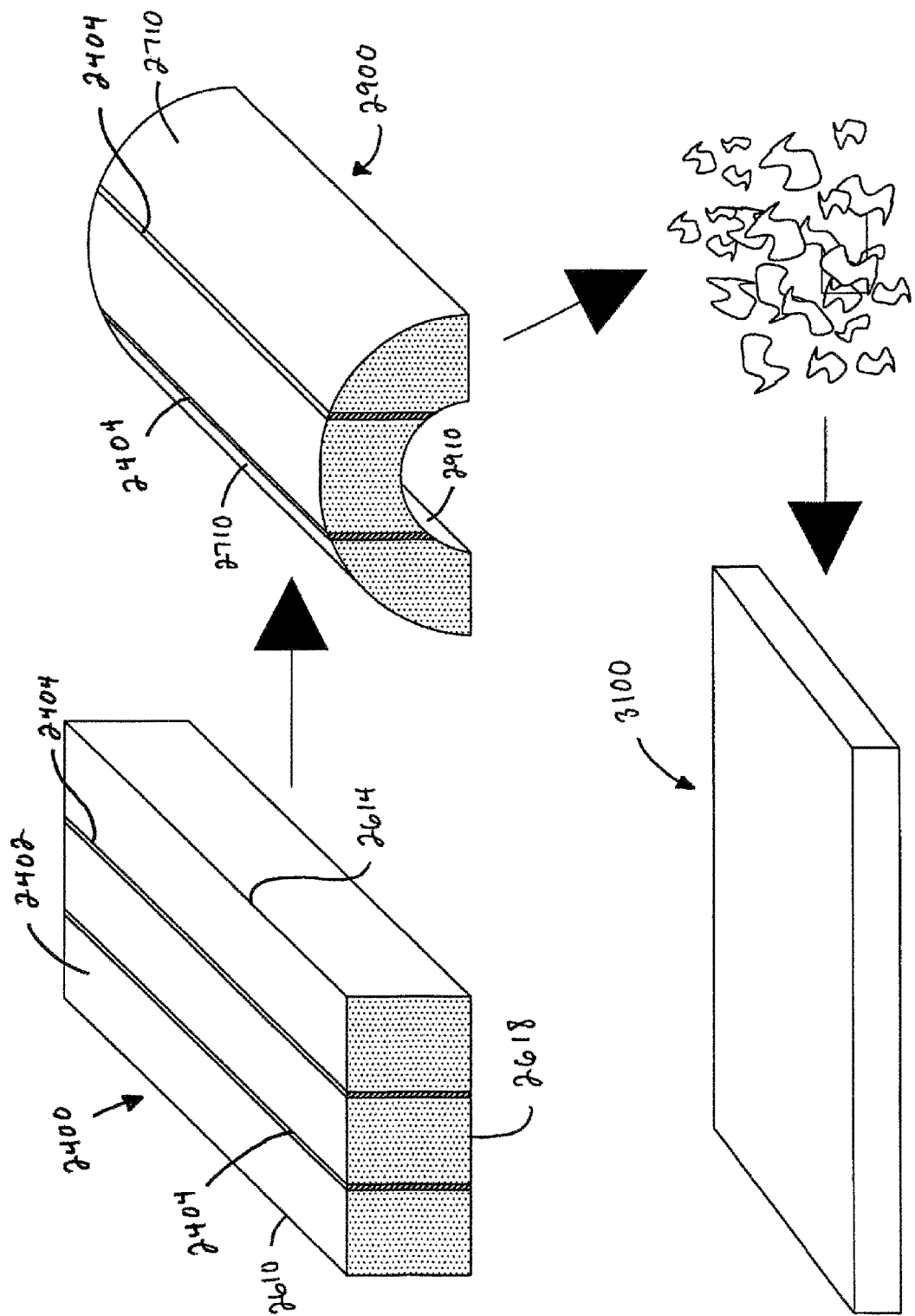
FIG. 31 schematically illustrates forming a foam product and recycling foam material that is removed during forming of the foam product to make a new foam board.

FIG. 31 illustrates an exemplary embodiment of a method of making a foam product 2900 and recycling the polystyrene foam to make new polystyrene boards 3100. In the embodiment illustrated by FIG. 31 a smaller foam piece 2400 is provided that is machined from one of the laminated polystyrene boards 1300, 1700 described herein. Since the laminated polystyrene boards 1300, 1700 are made only from the polystyrene material of the boards, the smaller foam pieces also only include polystyrene. The billet 2400 is machined to remove a portion 3102 of the extruded polystyrene to form the foam product 2900. For example, the billet 2400 may be machined as illustrated by the embodiment of FIGS. 26-29. The removed polystyrene material 3102 is recycled to make another polystyrene product. For example, the polystyrene material 3102 may be recycled to make a new polystyrene board or be mixed with virgin polystyrene material that is used to make a new polystyrene board 3100.

Figure 38:
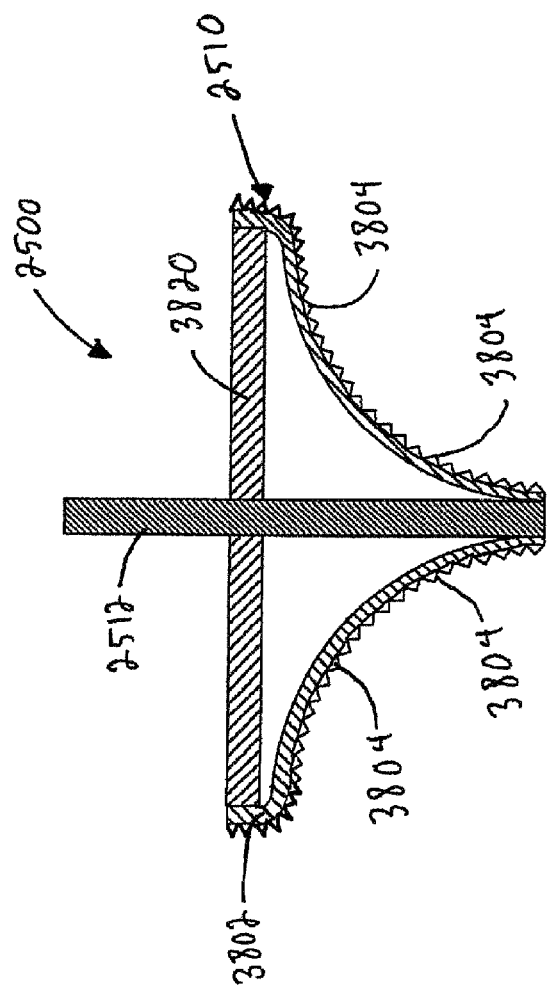
FIG. 38 is a sectional view of an exemplary embodiment of a rotary cutting tool for shaping foam products.

FIG. 38 illustrates an exemplary embodiment of a rotary cutting tool 2500 for shaping foam products, such as the foam product 2900 illustrated by FIG. 30. The rotary foam cutting tool 2500 can be used to cut a wide variety of different foams including, but not limited to, single layer foam boards or pieces and multilayer foam boards and pieces. The rotary cutting tool can cut multilayer foam boards or pieces that are thermally laminated together and/or that are bonded together with an adhesive. The illustrated rotary cutting tool 2500 includes an annular support 3802 made from sheetmetal, such as aluminum or steel, and cutting elements 3804 secured to the annular sheetmetal support 3802. A base 3820 is secured to the sheetmetal annular support 3802 for rotating the sheetmetal annular support 3802 and attached cutting elements 3804.

Figure 33:
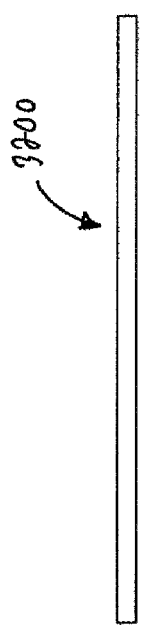
FIG. 33 is a side view of the flat piece of sheetmetal illustrated by FIG. 32.
Figure 32:
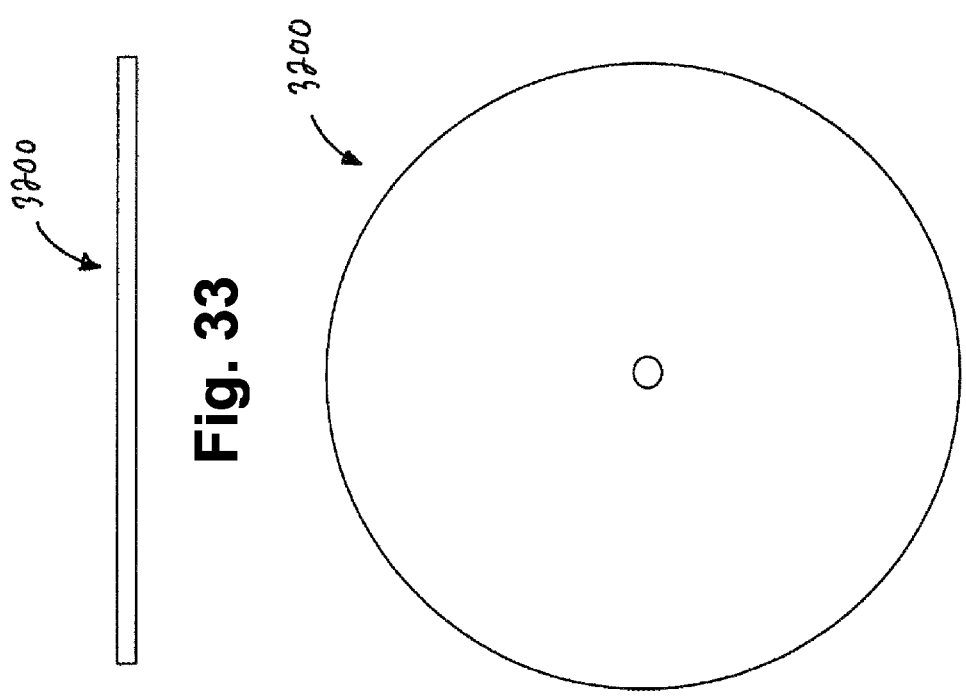
FIG. 32 is a plan view of an exemplary embodiment of a piece of flat sheetmetal.
Figure 34:
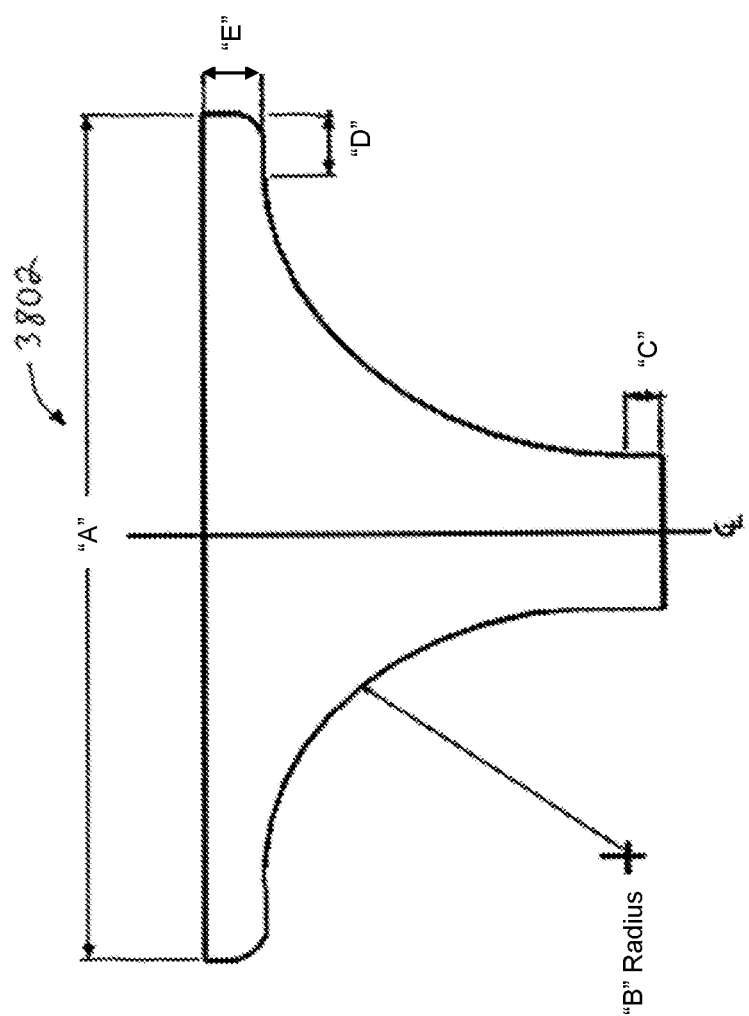
FIG. 34 is a sectional view of an exemplary embodiment of a sheetmetal annular support of a foam cutting tool.

The annular sheetmetal support 3802 can be made in a wide variety of different ways. For example, the sheetmetal support can be made by spin-forming, stamping, drawing, deep drawing, or any other conventional sheetmetal forming technique. FIGS. 32 and 33 illustrate that the annular support 3802 can be formed from a flat, circular sheetmetal disk 3200. The sheetmetal disk 3200 can be formed into the annular support 3802 shape illustrated by FIG. 34 by spin-forming, stamping, drawing, deep drawing, or any other conventional sheetmetal forming technique.

The cutting elements 3804 can be secured to the annular sheetmetal support 3802 in a wide variety of different ways. For example, the cutting elements 3804 can be secured to the annular sheetmetal support 3802 by brazing, welding, with an adhesive or any other conventional adhesion technique. The cutting elements can take a wide variety of different forms. In one exemplary embodiment, the cutting elements 3804 are made from a material that wears very slowly when cutting polystyrene foam, such as carbide, hardened steel, ceramics and other hard materials. In one exemplary embodiment, the cutting elements 3804 are spaced apart a sufficient distance that prevents the build up and retention of the polystyrene foam. This prevention of the accumulation of the foam material on the tool reduces friction between the tool and the part, which improves the life expectancy of the tool and provides for a cleaner cut on the thermoplastic material. Referring to FIGS. 36 and 37, in one exemplary embodiment the cutting elements 3804 are initially provided on a tape 3600, such as a brazing tape or an adhesive tape. The tape 3600 is provided over the cutting surface 3602 of the sheetmetal support 3802 and then processed to permanently secure the cutting elements 3804 to the sheetmetal support 3802. For example the tape 3600 may be heated to braze the cutting elements 3804 to the sheetmetal support 3802 or cure an adhesive of the tape to secure the cutting elements to the sheetmetal support.

The base 3820 can take a wide variety of different forms. In the illustrates embodiment, the base 3820 includes a circular plate 3830. However, the base can comprise any structure for supporting and rotating the sheetmetal support 3802. The resulting cutting tool 2500 is hollow and lightweight. This hollow and lightweight configuration allows foam machining tools to be made in sizes that were not previously possible. The following table, with columns corresponding to the dimensions on FIG. 38, provides examples of cutting tools 3800 with the hollow and light weight configuration. Each row provides a different example. All dimensions in the following table are in inches. As can be seen from the chart and FIG. 34, tools 3800 having diameters A over 5 inches, over 10 inches, over 15 inches and over 20 inches can be made with the hollow sheetmetal design.

| "A" | "B" | "C" | "D" | "E" |
|---|---|---|---|---|
| 5.76 | 1.44 | 0.25 | 0.63 | 0.50 |
| 6.38 | 1.75 | 0.25 | 0.63 | 0.50 |
| 6.88 | 2.00 | 0.25 | 0.63 | 0.50 |
| 7.38 | 2.25 | 0.25 | 0.63 | 0.50 |
| 7.88 | 2.50 | 0.25 | 0.63 | 0.50 |
| 8.44 | 2.78 | 0.25 | 0.63 | 0.50 |
| 9.5 | 3.31 | 0.25 | 0.63 | 0.50 |
| 10.5 | 3.81 | 0.25 | 0.63 | 0.50 |
| 11.5 | 4.31 | 0.25 | 0.63 | 0.50 |
| 12.5 | 4.81 | 0.25 | 0.63 | 0.50 |
| 13.63 | 5.38 | 0.25 | 0.63 | 0.50 |

The present application discloses several different embodiments of thermally laminated foam boards, methods for making thermally laminated foam boards, apparatus for making thermally laminated foam boards, smaller foam pieces made from thermally laminated foam boards, methods for making smaller foam pieces from thermally laminated foam boards, parts made from thermally laminated foam boards, methods for making parts from thermally laminated foam boards, and tools for making parts from thermally laminated foam boards. Any of the features of any of the embodiments disclosed in this application can be combined with any of the features of any of the other embodiments disclosed by this application. Additional exemplary embodiments of the present application comprise combinations and subcombinations of the features of the exemplary embodiments described above.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A rotary cutting tool for shaping insulation products, comprising:
   an annular support having a concave, or a convex, exterior annular surface formed from sheetmetal;
   a plurality of discrete, cutting elements permanently secured to the concave, or the convex exterior, annual surface; and
   a base secured to the sheetmetal annular support for rotating the sheetmetal annular support and attached cutting elements,
   wherein the rotary cutting tool has a closed, hollow interior space.

2. The rotary cutting tool of claim 1 wherein the annular support is made by spin forming.

3. The rotary cutting tool of claim 1 wherein the plurality of cutting elements include carbide, ceramic, or hardened steel.

4. The rotary cutting tool of claim 1 wherein each of the plurality of cutting elements are pointed teeth spaced apart from each other on the exterior surface of the annular support.

5. The rotary cutting tool of claim 4 wherein the plurality of cutting elements are uniformly spaced apart.

6. The rotary cutting tool of claim 4 wherein the insulation product is a foam insulation material and the plurality of cutting elements are spaced apart a sufficient distance that prevents the build-up and retention of foam insulation material on the rotary tool when cutting the foam insulation material.

7. The rotary cutting tool of claim 6 wherein the foam insulation material is polystyrene foam insulation.

8. The rotary cutting tool of claim 4 wherein the annular support has a proximal end attached to the base and a distal tip opposite the proximal end, wherein the plurality of pointed teeth are attached along the annular support from the proximal end to the distal tip.

9. The rotary cutting tool of claim 1 wherein the annular support and the base form a hollow cutting tool.

10. The rotary cutting tool of claim 1 wherein the annular support is shaped as a hemisphere facing away from the base.

11. The rotary cutting tool of claim 1 wherein the annular support has a proximal end attached to the base and a distal tip opposite the proximal end, wherein the plurality of cutting elements are attached along the annular support from the proximal end to the distal tip.

12. The rotary cutting tool of claim 1 wherein the cutting tool has a diameter of over 10 inches.

13. The rotary cutting tool of claim 1 wherein the cutting elements are thermally bonded onto the exterior surface of the annular support.

\* \* \* \* \*